(12) United States Patent
Heeman

(10) Patent No.: US 9,334,073 B2
(45) Date of Patent: May 10, 2016

(54) MANDREL TO BE SUSPENDED IN A SLEEVING DEVICE FOR ARRANGING SLEEVES AROUND CONTAINERS, SLEEVING DEVICE AND METHOD FOR ARRANGING SLEEVES AROUND CONTAINERS

(71) Applicant: FUJI SEAL INTERNATIONAL, INC., Osaka-shi, Osaka (JP)

(72) Inventor: Frederik Gerardus Heeman, Venlo (NL)

(73) Assignee: FUJI SEAL INTERNATIONAL, INC., Osaka-shi (JP)

( * ) Notice: Subject to any disclaimer, the term of this patent is extended or adjusted under 35 U.S.C. 154(b) by 677 days.

(21) Appl. No.: 13/673,613

(22) Filed: Nov. 9, 2012

(65) Prior Publication Data

US 2013/0118120 A1    May 16, 2013

Related U.S. Application Data

(60) Provisional application No. 61/564,001, filed on Nov. 28, 2011.

(30) Foreign Application Priority Data

Nov. 14, 2011   (NL) ..................................... 2007785

(51) Int. Cl.
*B65B 11/00* (2006.01)
*B65C 3/06* (2006.01)
(Continued)

(52) U.S. Cl.
CPC . *B65B 11/00* (2013.01); *B26D 1/38* (2013.01); *B26D 3/16* (2013.01); *B29C 63/423* (2013.01);
(Continued)

(58) Field of Classification Search
CPC ...... B29C 63/423; B65B 11/02; B65B 11/00; B65C 3/065; B65C 3/14
USPC ............. 53/582, 399, 204, 389.2, 389.3, 442, 53/459, 567, 557, 585
See application file for complete search history.

(56) References Cited

U.S. PATENT DOCUMENTS

| 3,370,116 A | 2/1968 | Wrede |
| 3,757,164 A | 9/1973 | Binkowski |

(Continued)

FOREIGN PATENT DOCUMENTS

| JP | A-63-93597 | 4/1988 |
| JP | B2-6-69676 | 9/1994 |

(Continued)

OTHER PUBLICATIONS

Apr. 12, 2012 Search Report issued in Dutch Patent Application No. NL 2007785 (with translation).
(Continued)

*Primary Examiner* — Michelle Lopez
*Assistant Examiner* — Eduardo R Ferrero
(74) *Attorney, Agent, or Firm* — Oliff PLC

(57) ABSTRACT

The invention relates to a mandrel, a sleeving device and a method for sleeving containers. The mandrel is suspended in the sleeving device. The mandrel opens a foil to form sleeves. The foil is fed around the tubular outer surface of the mandrel. According to the invention the outer surface of the mandrel is formed by at least two separate mandrel bodies. At least one of the mandrel body is biased outwardly to increase the circumference of the outer surface. This circumference is automatically adapted to the current, instantaneous circumference of the foil fed around the mandrel.

18 Claims, 13 Drawing Sheets

Figure 1:
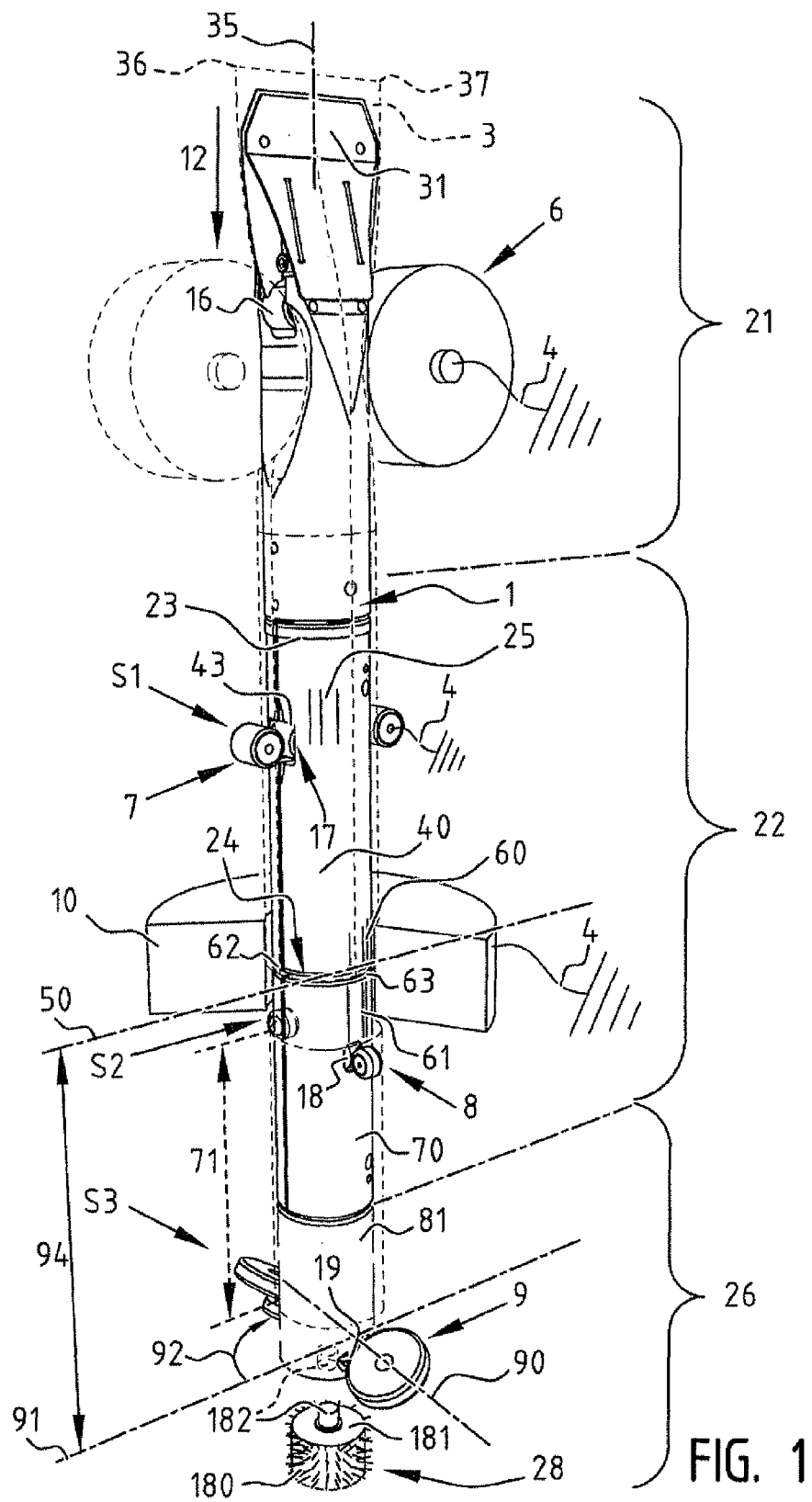

(51) Int. Cl.
*B65B 9/14* (2006.01)
*B26D 3/16* (2006.01)
*B29C 63/42* (2006.01)
*B65B 61/08* (2006.01)
*B26D 1/38* (2006.01)
*B26D 7/00* (2006.01)

(52) U.S. Cl.
CPC . *B65B 9/14* (2013.01); *B65B 61/08* (2013.01); *B65C 3/065* (2013.01); *B26D 2007/0037* (2013.01)

(56) References Cited

U.S. PATENT DOCUMENTS

| | | | | |
|---|---|---|---|---|
| 4,016,704 | A * | 4/1977 | Fujio | 53/399 |
| 4,600,371 | A * | 7/1986 | Fresnel | 425/110 |
| 4,765,121 | A * | 8/1988 | Konstantin et al. | 53/442 |
| 4,885,826 | A * | 12/1989 | Strudel | 26/80 |
| 4,910,941 | A * | 3/1990 | Nagano et al. | 53/291 |
| 4,964,765 | A * | 10/1990 | Kishi | 409/181 |
| 5,018,914 | A * | 5/1991 | Kishi | 409/178 |
| 5,233,734 | A * | 8/1993 | Strudel et al. | 26/80 |
| 5,265,988 | A * | 11/1993 | Schmigalla et al. | 408/225 |
| 5,531,858 | A * | 7/1996 | Hong | 156/556 |
| 5,759,337 | A * | 6/1998 | Fujio et al. | 156/443 |
| 6,016,641 | A * | 1/2000 | Nagano | 53/298 |
| 6,684,599 | B1 * | 2/2004 | Fresnel | 53/64 |
| 7,024,841 | B2 | 4/2006 | Krämer et al. | |
| 7,028,451 | B2 * | 4/2006 | Braun | B65B 59/04 53/550 |
| 7,069,707 | B2 * | 7/2006 | Braun | B65B 59/04 493/476 |
| 8,613,183 | B2 * | 12/2013 | Nyren | 53/585 |
| 2004/0128958 | A1 * | 7/2004 | Kramer et al. | 53/567 |
| 2009/0263050 | A1 * | 10/2009 | Eberhardt | B29C 65/18 383/205 |
| 2010/0037556 | A1 * | 2/2010 | Fresnel | 53/218 |
| 2010/0077895 | A1 * | 4/2010 | Beier | 83/191 |
| 2011/0240588 | A1 * | 10/2011 | Terrasi | 215/40 |

FOREIGN PATENT DOCUMENTS

| | | |
|---|---|---|
| JP | A-11-91733 | 4/1999 |
| WO | WO 2008/088210 A1 | 7/2008 |
| WO | WO 2011/031160 A1 | 3/2011 |
| WO | WO 2011/118105 | 9/2011 |

OTHER PUBLICATIONS

Apr. 12, 2012 Written Opinion issued in Dutch Patent Application No. NL 2007785.

* cited by examiner

MANDREL TO BE SUSPENDED IN A SLEEVING DEVICE FOR ARRANGING SLEEVES AROUND CONTAINERS, SLEEVING DEVICE AND METHOD FOR ARRANGING SLEEVES AROUND CONTAINERS

This nonprovisional application claims the benefit of U.S. Provisional Application No. 61/564,001, filed Nov. 28, 2012, and Application No. 2007785, filed Nov. 14, 2011 in the Netherlands.

The invention relates to a mandrel and a sleeving device for arranging sleeves around containers. The inventions relates to a method for arranging sleeves around containers using a mandrel.

A sleeving device using a mandrel, and a method for arranging sleeves around containers are well known from prior art. Reference is made to applications WO2011118105-A and WO2011031160-A in the name of the same applicant and incorporated by reference. A known method comprises feeding of a foil, feeding foil around a mandrel such that is fed over the outer surface of the mandrel, cutting the foil into sleeves, and arranging the sleeves around a container or other package, which will allow to form a labelled product e.g. after heat shrinking the sleeve around product.

The mandrel or spreading element disclosed in WO2011/031160A1 is suspended in a sleeving device. The mandrel can be suspended on one or more foil transport rollers in the sleeving device. Rollers mounted on the frame of the sleeving device engage on rollers mounted on the mandrel and foil or sleeves is fed between the roller during the sleeving process.

The mandrel comprises a generally cylindrical outer surface around which the foil is fed. Other forms and shapes are possible too. In order to allow feeding of the foil/sleeve around the mandrel, the outer surface of the mandrel has a circumference that is similar to the inner circumference of the foil/sleeves fed around that outer surface. The mandrel can have a diaphragm that allows supporting the foil/sleeves and improves further processing of the foil and sleeves such as cutting and transporting the sleeve further downstream to arrange it around the container or product.

From U.S. Pat. No. 7,024,841 a sleeving device is known that allows spreading the sleeve during the cutting step using active elements. An actuator, driven and controlled from outside, is used to spread the sleeve. From JP11091733-A mandrel is known comprising movable mandrel halves that can be separated along a vertical central line of the mandrel allowing to adjust the mandrel's circumference slightly to different inner circumference of the sleeve/foil. The displacement of the mandrel halves is configured only in an initial step of the process. During the process, the distance is not changed.

Closest prior art is formed by JP-6-069676-B disclosing a mandrel body having an arm that is hingeably mounted in the mandrel. An actuator comprising a solenoid is mounted on the frame and can be used to move the arm inwards against the biasing force of a spring. The arm will hinge. The circumference of the mandrel will increase only as a result of the actuator. The bias will move the arm back, reducing the circumference.

The foil fed to the sleeving device can have a varying inner circumference. This variance can lead to all sorts of problems during sleeving, e.g. during cutting of the sleeve.

According to an aspect of the invention, a mandrel is provided that is to be suspended in a sleeving device for arranging sleeves around products such as containers. In an embodiment the mandrel is arranged for opening a foil to form a sleeve, the mandrel having a substantially tubular outer surface around which foil is fed. Other cross sections are possible. Preferably the mandrel is suspended in a vertical position. Foil and sleeves are moved in a downward manner.

According to the invention the tubular outer surface of the mandrel is formed by at least two separate mandrel bodies, wherein at least one mandrel body is biased outwardly to increase the circumference of the outer surface. Using a suitable biasing element the circumference of the outer surface is continually adjusted to varying diameters of the foil/sleeves during the process without the use of an actuator.

In an embodiment the at least one mandrel body biased outwardly is radially moveable connected to the mandrel. In particular the mandrel body can move, as a whole, perpendicular to an axial direction of the mandrel. This ensures that the complete outer surface of the mandrel body is outwardly biased, to approximate the inner circumference of the foil and to support the foil as it is fed over the mandrel surface.

In an embodiment the one or more biasing elements can be mounted on the mandrel. Biasing elements can comprise pneumatic or magnetic elements. Similar magnetic poles (repulsing) can be used to create outwardly biased elements. If the foil circumference decreases slightly, the circumference of the outer surface decreases slightly moving against the outwardly biasing force. If the circumference of the foil increases, the biasing foil will increase the circumference of the outer surface. As a result, the mandrel will support the current cross section of the sleeve that surrounds mandrel during the process.

It will be clear that any cross section of the outer surface of the mandrel can be used. The outwardly directed bias results in automatically adjusting the circumference of the outer surface of the mandrel to the current inner sleeve circumference.

In an embodiment the mandrel comprises an outwardly biased element that connects both mandrel bodies. Such a biased element ensures outwardly directed bias. The biasing element will continually provide a force that intends to increase the distance between the two bodies.

Clearly three, four or more mandrel bodies can be used to form the outer surface of the mandrel.

In an embodiment the outwardly biased element comprises a spring. A spring provides a biasing foil without the need of an actuator. Spring is easily comprised in the mandrel. A spring has low wear.

In an embodiment the at least two mandrel bodies form opposite sides of the outer surface of the mandrel. In an embodiment the two mandrel bodies form mandrel halves on opposite sides of the central line of the mandrel. This will allow adjusting the cross section of the mandrel while maintaining this cross section close to the desired cross section, such as circular.

In an embodiment the mandrel comprises a central frame, such as a pin received in and enclosed by the mandrel bodies extending in an axial direction of the mandrel, generally parallel to the feeding direction, and at least one of the mandrel bodies is movably connected to the central frame.

Further elements of the mandrel, such as the spreading tip or the shooting end can be connected to the central frame. The central frame allows mounting the two mandrel bodies to the mandrel. In an embodiment one of the mandrel bodies is attached to the central frame. In an embodiment the mandrel body comprises the central frame and is an integral part thereof.

In an embodiment the mandrel comprises a guide or a hinge connecting at least one of the mandrel bodies movable to the central frame and/or to the other mandrel body/bodies. The guide or hinge allows at least one degree of freedom for displacing the one mandrel body with respect to the central frame or with respect to the other mandrel body respectively.

In a further embodiment the outer surface of at least one of the mandrel bodies comprises a diaphragm over which the foil is fed. The diaphragm forms a local increase of the radius of the outer surface. Other parts of outer surface can have a smaller radius. The diaphragm extends outwardly beyond most parts of the mandrel's outer surface. In an embodiment a clearance of less than 1, preferably 0.5 mm, more preferably less than 0.3 mm in radius difference between diaphragm and other parts of the outer surface allows reducing friction forces of the sleeves fed over the outer surface and still reaching a maximum possible support of the outer surface to reach rigid tube characteristics of the foil/sleeves.

As the diaphragm and other parts of the outer surface having a smaller diameter are part of the same mandrel body, the clearance between the radius of the diaphragm/rest is maintained even when the inner circumference of the foil/sleeves varies.

In an embodiment the diaphragm is positioned near an upstream end of the biased mandrel body. In an embodiment the diaphragm is positioned upstream from the blade clearance. An upstream end of the mandrel can have a spreader. Directly upstream the diaphragm the mandrel has a fixed radius/circumference. First tip of the mandrel outer surface having a variable circumference comprises the diaphragm and provides the, e.g. tubular, support for the foil/sleeve in a further downstream process.

In an embodiment the mandrel comprises one or more foil transport rollers. The foil transport rollers allow suspending the mandrel in the sleeving device and are arranged to allow feeding the foil over the mandrel outer surface. The foil transport rollers can be mounted in the mandrel by bearing.

In an embodiment the diaphragm is preferably positioned upstream from foil transport rollers and the mandrel body having the diaphragm forms the outer surface of the mandrel both upstream and downstream from said foil transport rollers. The foil transport roller is positioned in the outer surface having the somewhat reduced outer radius with respect to the diaphragm. The roller on the mandrel can in combination with transport rollers mounted on the sleeving device act as pullers of the foil over the diaphragm. Pulling the foil of the diaphragm increases the reliability of the mandrel and sleeving device with respect to the situation wherein the foil is fed over the diaphragm by pushing. Transport rollers positioned upstream from the diaphragm guide the foil toward the diaphragm, In an embodiment the mandrel body comprises a blade clearance or cutting groove that allows cutting the foil/sleeve fed over the mandrel into separate sleeve parts. The cutting space can be used by knives of the cutting apparatus mounted in the sleeving device. Cutting devices as such are known from prior art and can comprise for example four or six rotational actuated knives.

In an embodiment the mandrel body forms the outer surface of the mandrel both upstream and downstream of the blade clearance. This allows having an adapted outer circumference of the mandrel both upstream and downstream of the blade clearance. When the circumference is adapted (against or as a result of the outward bias) to the current inner circumference of the foil/sleeve, the circumference is adapted both upstream and downstream from the blade clearance. The arrangement around the blade clearance is symmetrical.

Preferably the outer circumferences on both sides of the clearance are equal. Here circumference can be the angular length of the mandrel body forming the outer surface. This symmetrical embodiment allows the cutting forces during cutting to be also symmetrical which is beneficial for the cutting process reducing the formation of pigtails.

In an embodiment the mandrel body has a small chamfer directly upstream or downstream of the blade clearance. Such a chamfer, preferably also symmetrically arranged around the clearance, improves the cutting results.

In a further embodiment foil transport rollers are mounted on the mandrel upstream from the blade clearance and downstream from the diaphragm. This will also ensure a significant distance between the diaphragm and the blade clearance. The diaphragm applies an outwardly directed force on the foil that is not desired when the foil is cut. During cutting tension in the foil is reduced and completely lost when the cutting is complete. If tension is present, the foil can move as a result of releasing the tension, resulting in pigtails. With an increased distance between the diaphragm and the blade clearance and in particularly by positioning foil transport roller in between diaphragm and blade clearance, the shape of the sleeve before and after the blade clearance is similar reducing the chance of forming pigtails.

In a further embodiment the mandrel comprises an upstream tip for opening the foil, comprises a sleeve cutting part and comprises a downstream shooting part. The sleeve cutting part comprises the at least two mandrel bodies according the invention. In this embodiment the tip for opening the foil can have a fixed shape and the sleeve shooter part can also have a fixed shape/circumference.

In a further embodiment the mandrel tip comprises an inlet side configured as a generally flat element portion arranged to open the foil, and the mandrel tip comprises also transition elements. The mandrel widens from the inlet side in a direction perpendicular to the plane of the foil. In an embodiment the direction of the outwardly directed bias on the mandrel body is generally perpendicular to the plane of the foil. The position of the at least two mandrel bodies that can be moved in respect to each other is further defined by the position of the flat form of the foil. In order for the foil to obtain its tubular form around the mandrel, forces are needed to open to open the foil. In an embodiment the forces are exerted on the sides of the foil opposite each other rather than on the fold of the foil itself.

According to a further aspect the invention provides a sleeving device for arranging sleeve around containers. The device comprises a frame, a foil feeding unit mounted to the frame for feeding foil to the mandrel, a cutting unit for cutting a sleeve and a sleeve dispatch. According to an aspect the mandrel comprising any combination of features as disclosed in this application is suspended in the sleeving device.

According to yet a further aspect, a method of feeding a foil over a mandrel for arranging sleeves around containers is provided. According to the method a foil is fed to the mandrel and is fed over and around an outer surface of the mandrel. Foil is cut into individual sleeves and the individual sleeves are arranged around products, such as containers. The containers can be conveyed. In an embodiment of the invention the method comprises biasing the outer surface outwardly for tensioning the foil around the mandrel. This results in a mandrel having no externally actuated parts, that has a circumference that adapts to the varying inner circumference of the foil fed to the mandrel.

Any of the methods/devices disclosed herein according to any of the aspects can be combined with any of the implicit/explicit features disclosed herein.

Now the invention will be disclosed in more detail referring to the drawings showing embodiments of the invention. The shown embodiments do not limit the scope of protection of the invention but illustrate examples thereof. It will be clear to a person skilled in the art that features mentioned in the embodiments illustrate preferred embodiments, but can be replaced by other less preferred features. A skilled person will be able to generalize the examples as provided and these examples are also part of this disclosure and divisional applications could be directed at these explicit or implicit or generalized features.

Figure 2:
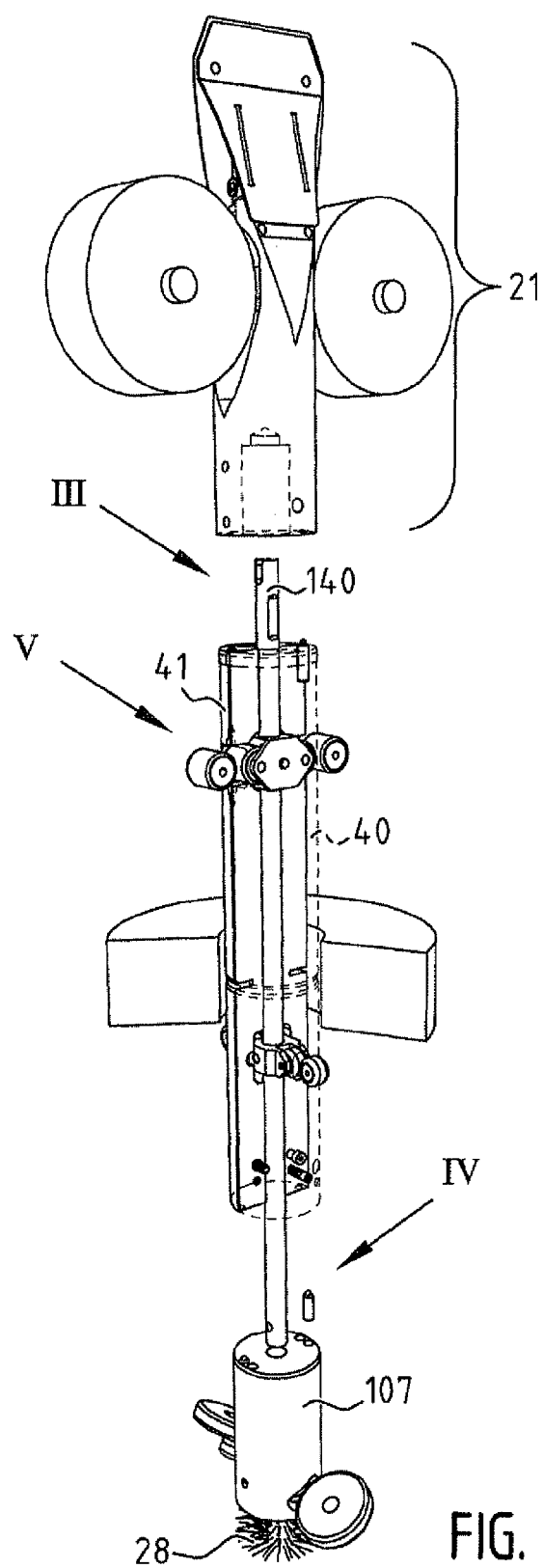
Figure 3:
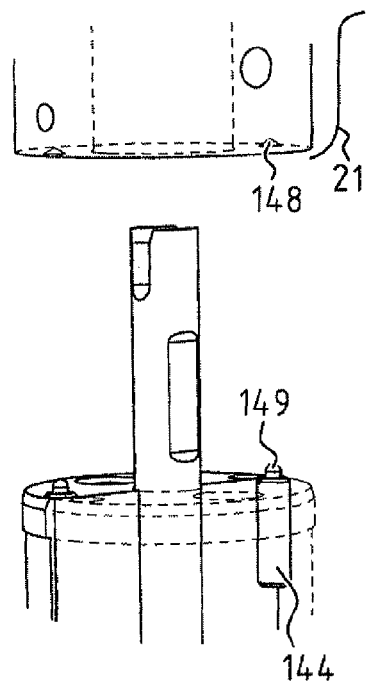
Figure 4:
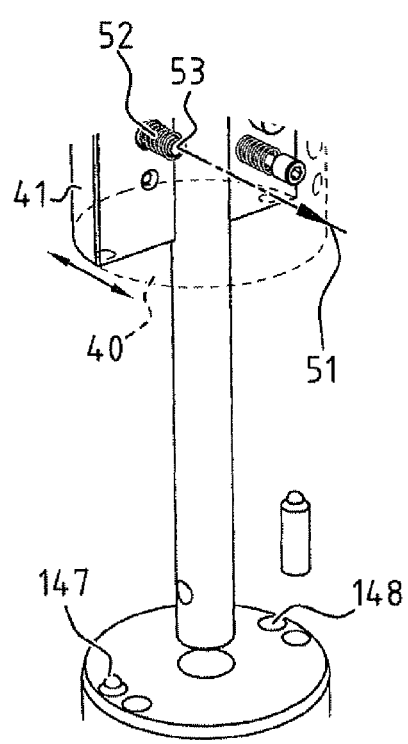
Figure 5:
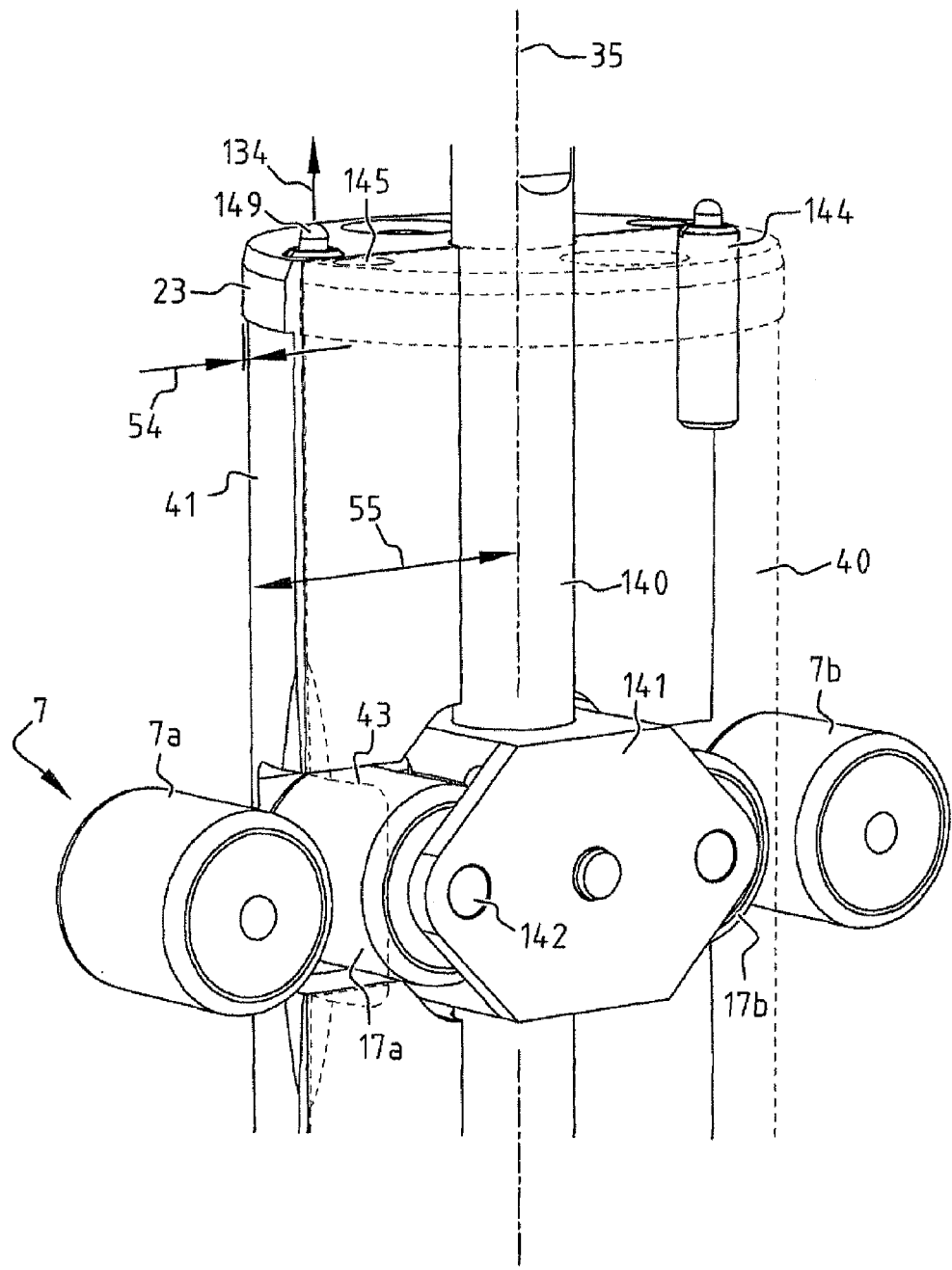
Figure 6A:
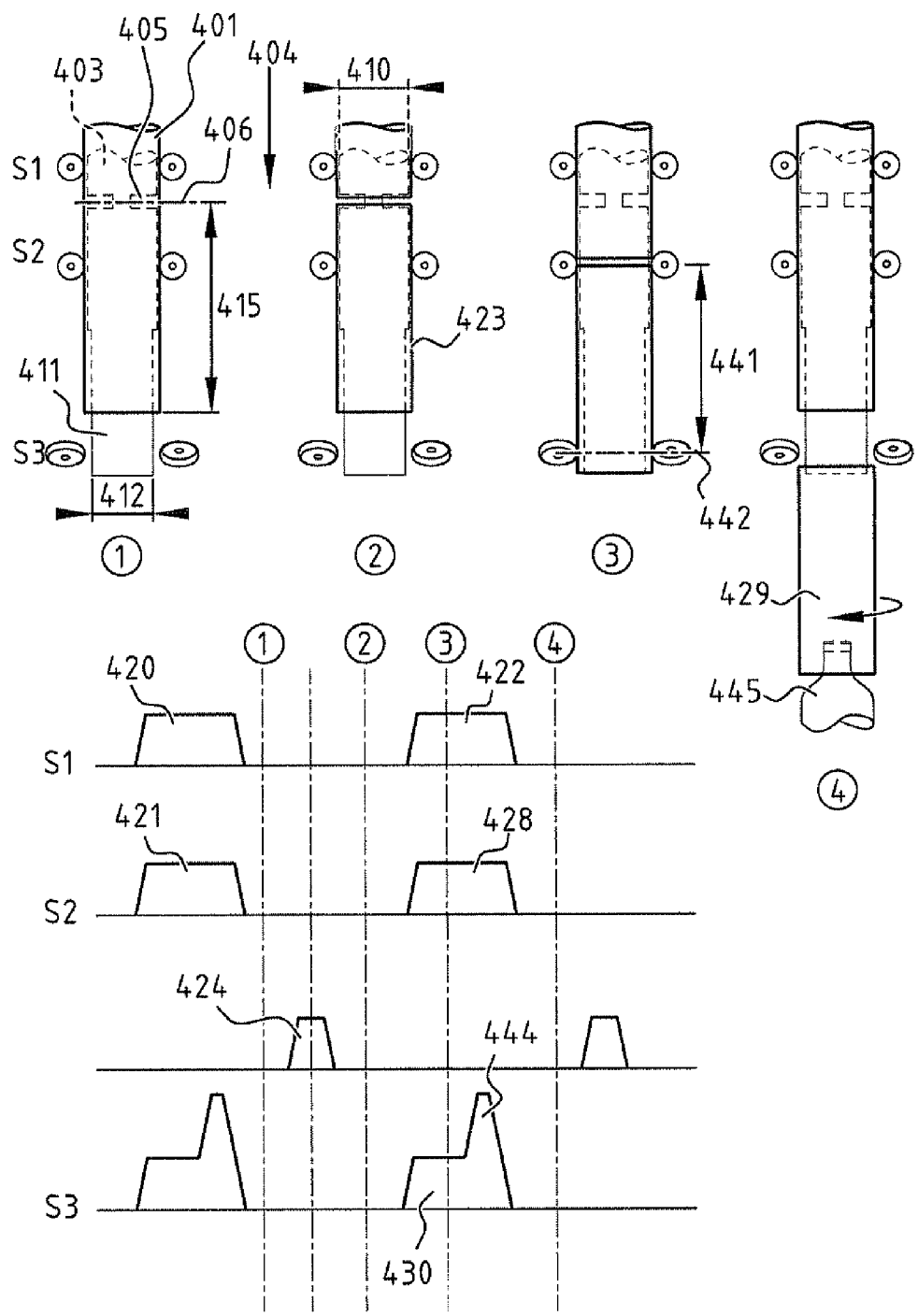
Figure 6B:
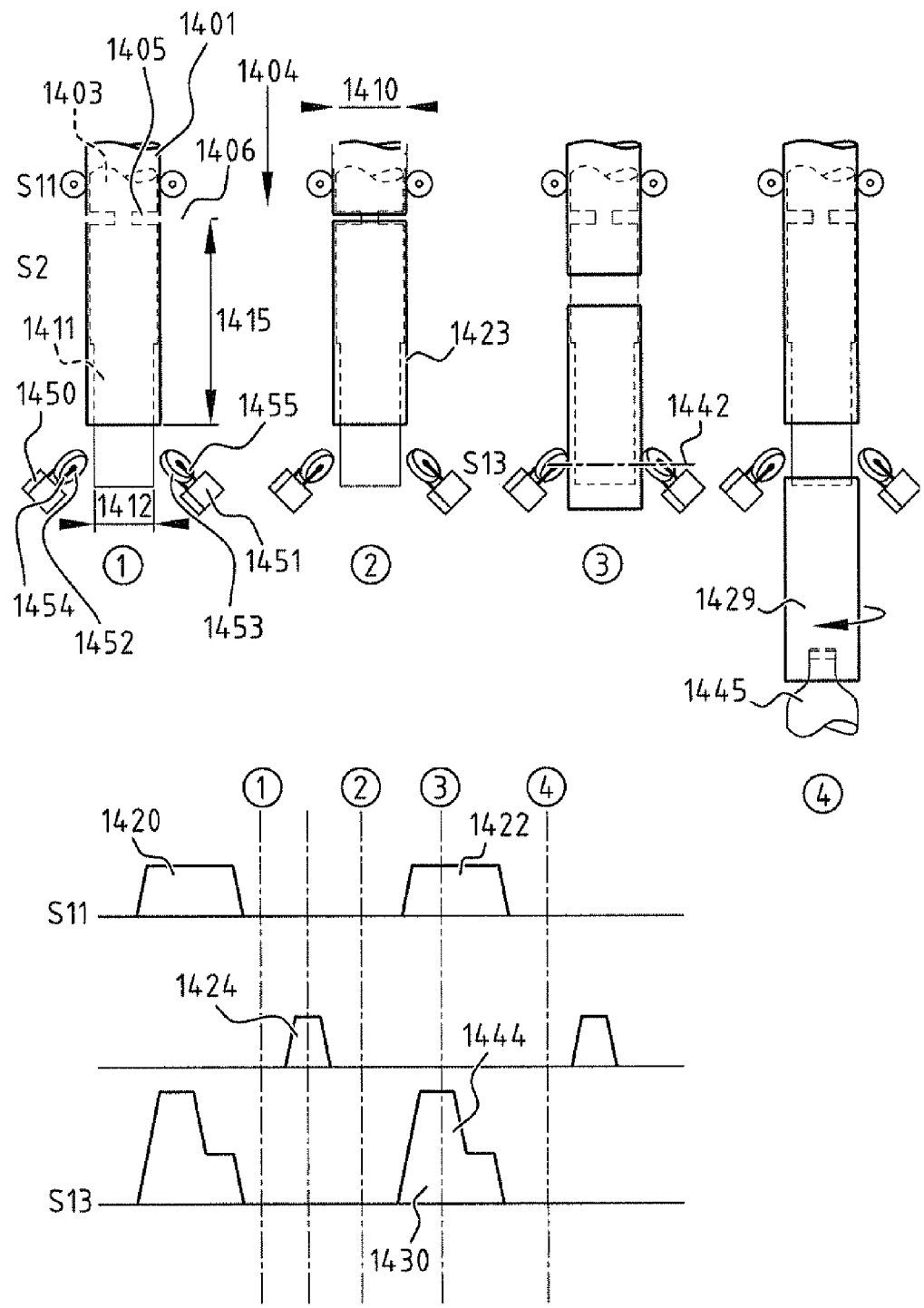
Figure 6C:
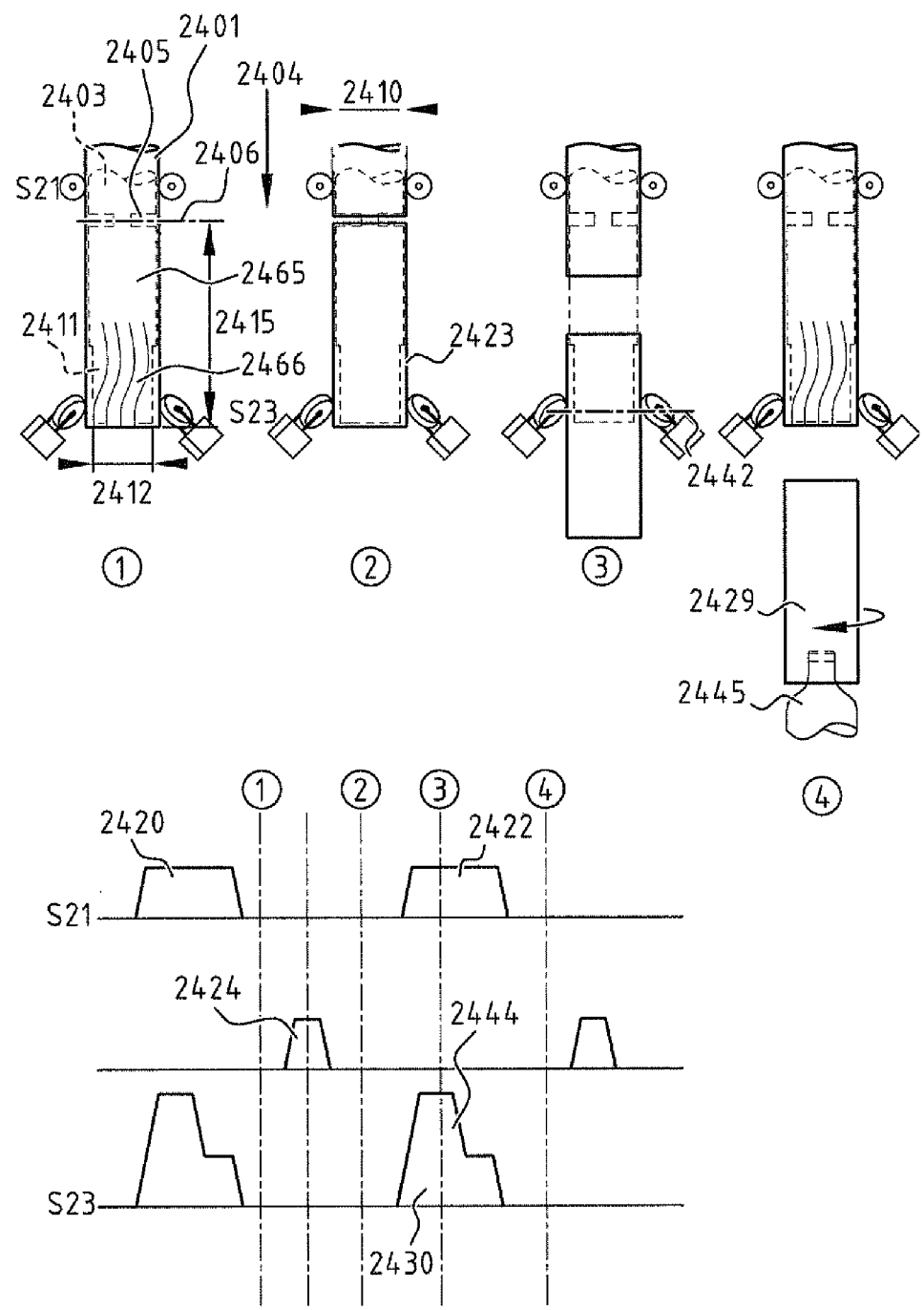
Figure 7:
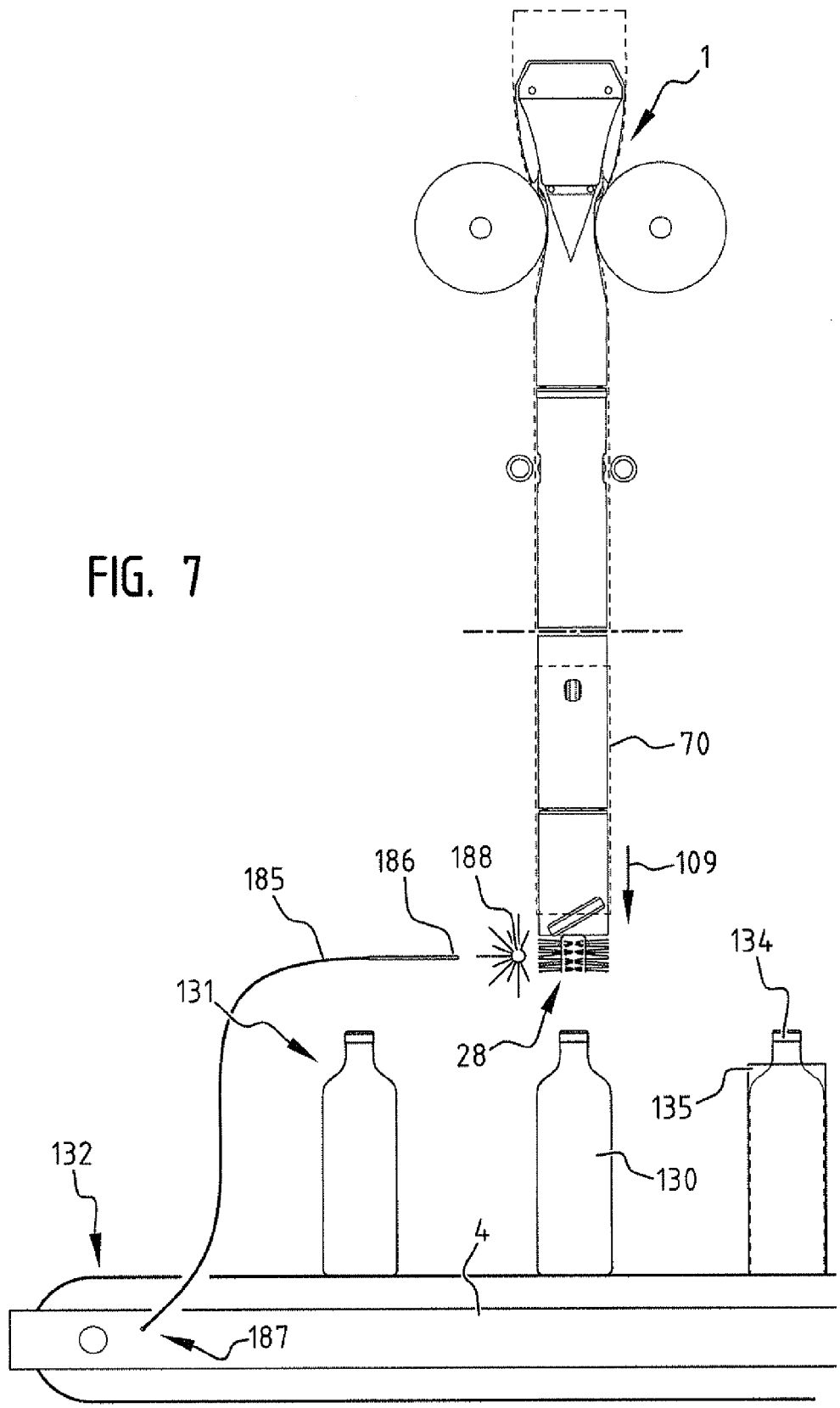
Figure 8A:
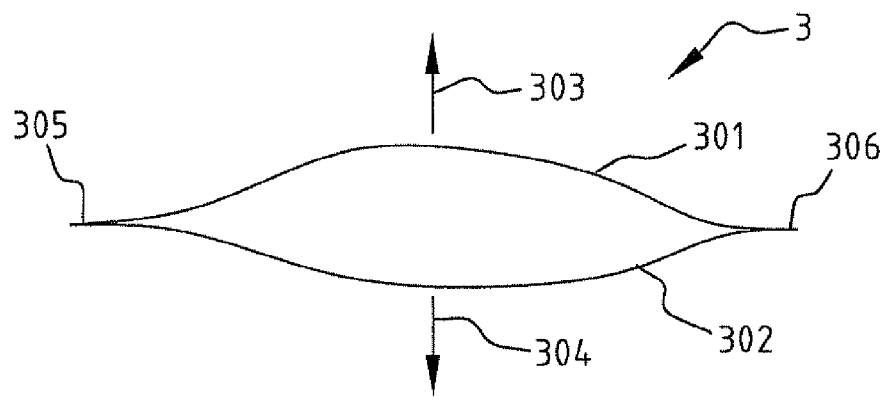
Figure 8B:
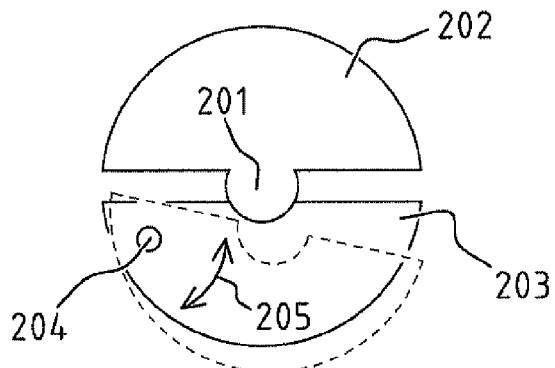
Figure 8C:
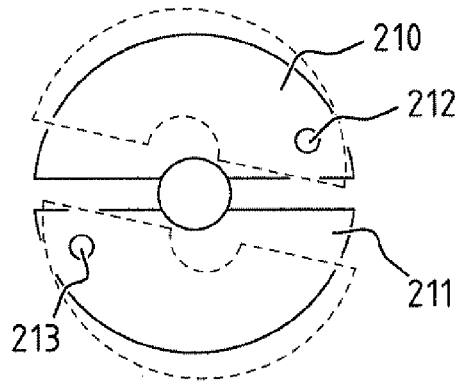
Figure 8D:
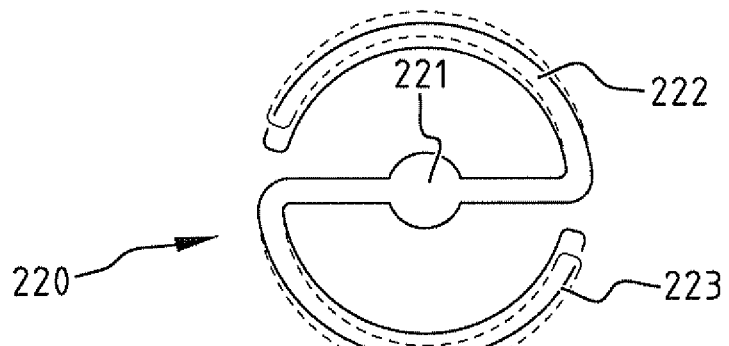
Figure 8E:
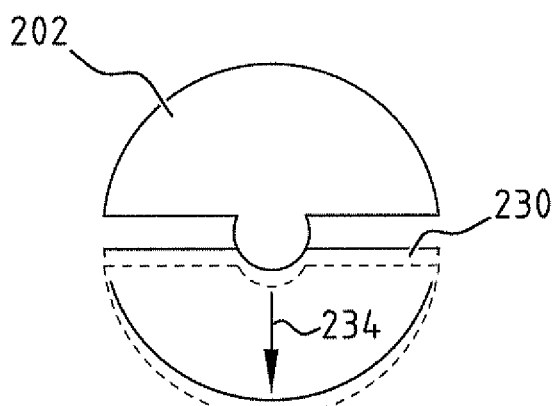
Figure 8F:
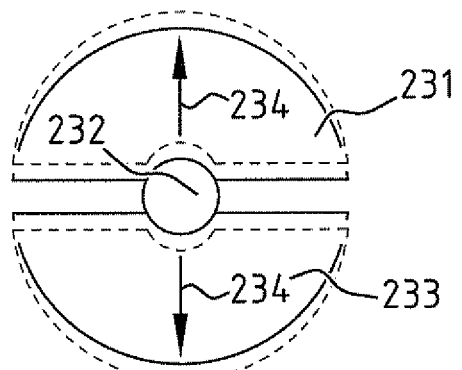
Figure 9:
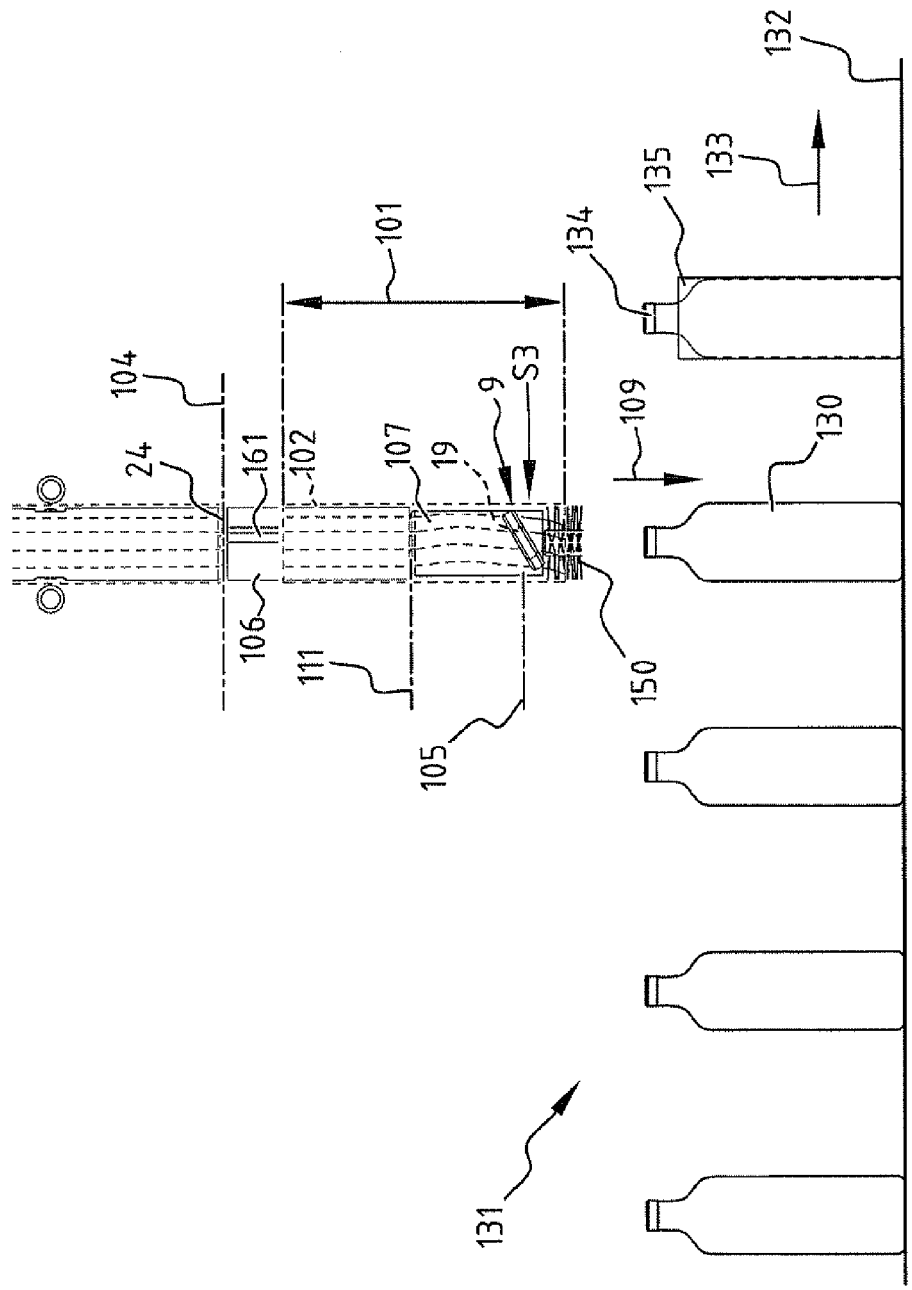
Figure 10:
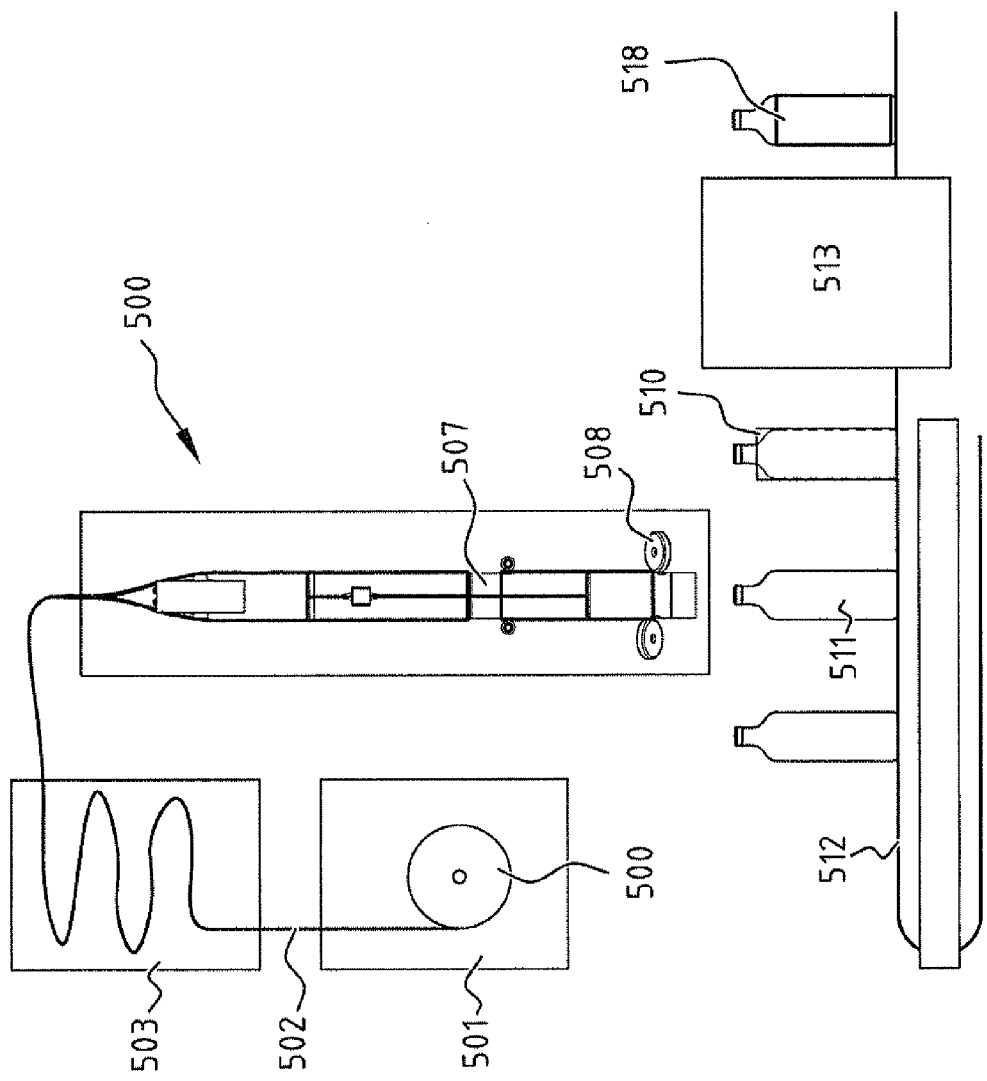
Figure 11:
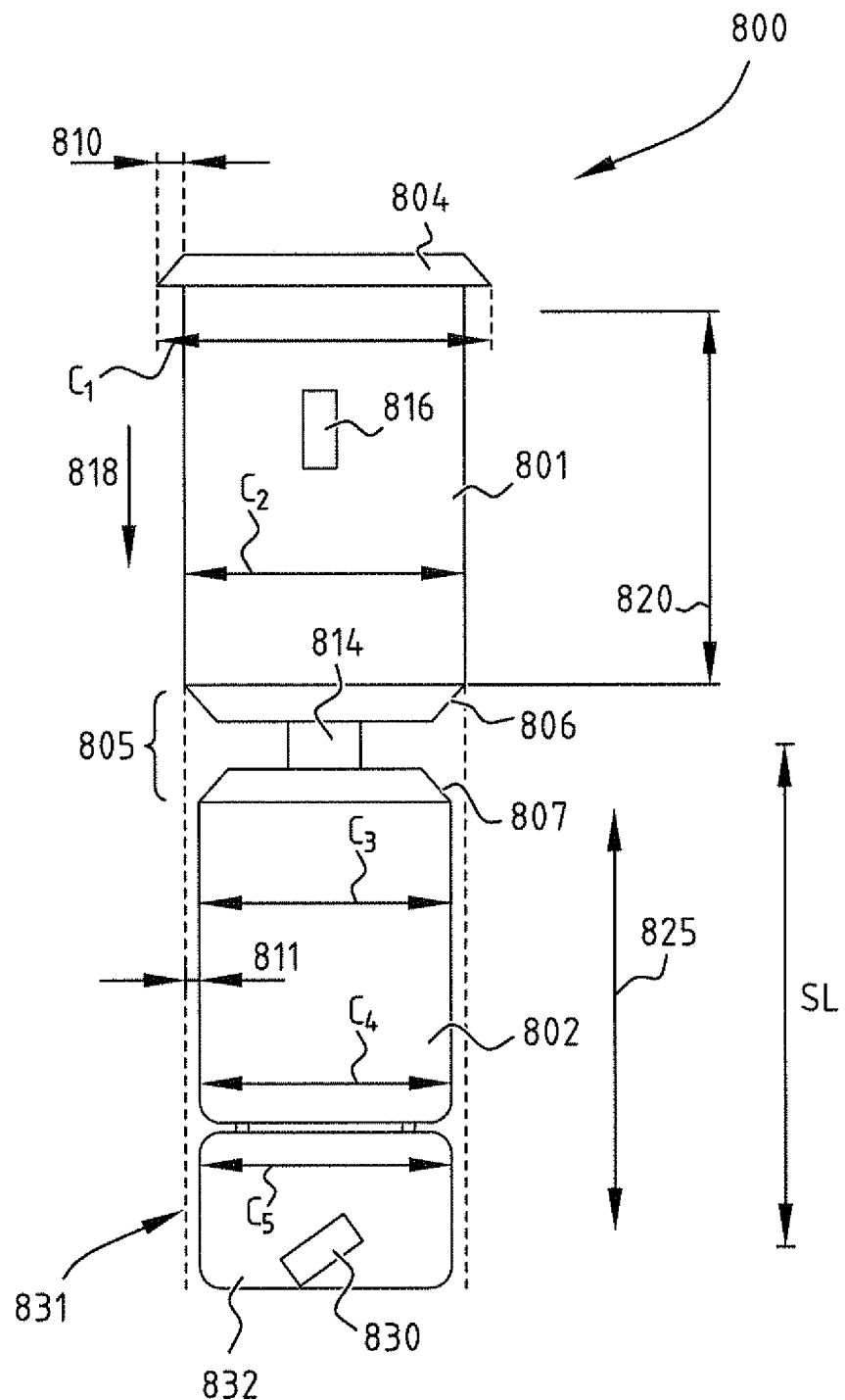

Embodiments will now be described referring to the drawing, wherein:

FIG. 1 shows a partially open view of a sleeving device and a mandrel according to a first embodiment, FIG. 2 shows a partially exploded view of a mandrel according to the first embodiment;

FIGS. 3 and 4 show details of the mandrel of the first embodiment according to III and IV respectively, FIG. 5 shows a detailed view of the mandrel according to the first embodiment according to V, FIG. 6a-c shows five steps of the method according to three embodiments, FIG. 7 shows a side view of a sleeving device according to another embodiment, FIGS. 8A-8F show embodiments of a cross-section of a mandrel for a sleeving device, FIG. 9 shows another embodiment of a mandrel, FIG. 10 shows a schematic overview of a system for sleeving a product comprising a sleeving device, and FIG. 11 shows a further embodiment of a mandrel.

FIG. 1 shows a mandrel I for opening a foil 3, shown with dotted lines. Foil 3 is provided as a flat envelop. The mandrel will open the envelope into a tubular envelope form. Individual sleeves can be cut from the foil and these sleeves are arranged around products. (not shown in FIG. 1). In any of the examples the mandrel can have a spreader, preferably near an upstream end. The spreader is arranged to open the foil.

In this application "sleeve" is used as an indication for the individual sleeves that are arranged around products. In an embodiment sleeves are fed to the sleeving device. "Foil" is used as indication of for a continuous strip of envelope material from which sleeves are to be cut.

The sleeving device is shown only partially in FIG. 1 in order to allow an open view of the mandrel 1. Frame 4 is part of the sleeving device frame that allows mounting several elements of the sleeving device. Mandrel 1 is suspended in a sleeving device. Transport roller 6 is arranged to suspend the mandrel 1. In any of the examples one or more rollers of the mandrel can engage rollers of the sleeving device such that the mandrel is suspended.

FIG. 1 shows the sleeving device having transport rollers 6,7,8, discharge unit 9 and cutting device 10. Transport rollers 6,7 and 8 comprise a couple of rollers 6a,6b,7a, 7b, 8a, 8b positioned on opposite sides of the mandrel 1. Transport rollers 6,7 and 8 are part of a foil supply or transport unit for feeding foil over the mandrel. Further feeding units can be provided upstream from the mandrel, such as a buffer for foil.

Foil 3 is fed from a reservoir, such as a roll. Foil is winded onto the roll and unwounded during supply to the sleeving device. Further upstream elements not shown in FIG. 1 can be a buffer for providing a continuous supply of foil, even when replacing the reservoir/roll, and further guides for positioning the foil 3, see e.g. FIG. 10.

Foil 3 is provided as a flat continuous film comprising two layers of plastic connected and folded at corners 36,37. In the transition from flat form to tubular form, most resistance against this opening will come from corners 36,37, as will be illustrated in FIG. 8a.

FIG. 8a shows a cross section of a partially opened foil 3 comprising two layers 301,302. The tip 31 of the spreader in the sleeving device will open the foil first in the middle part. The mandrel provides an opening force in the directions 303,304. Corners 305,306 will move inwards.

Foil 3 is opened and fed over the outer surface of the mandrel 1 according to arrow 12. The foil is fed from top to bottom and the top is the upstream end. The foil 3 is fed between the transport rollers 6,7,8 and transport rollers 16,17, 18 mounted on the mandrel. The transport rollers 6,7,8 can be connected to a drive, in some embodiments via a transmission to a single drive, for driving the rollers. The drive can comprise a controller for detailed control of the motion of the foil fed over the mandrel 1. An embodiment for the control and method of control is described referring to FIG. 6.

The mandrel 1 comprises an upstream opening part, spreader 21 for opening the foil 3, a cutting part 22 and a downstream sleeve shooter part 26. The cutting part 22 comprises a diaphragm 23 and a blade clearance 24.

Diaphragm 23 is, in the embodiment according to FIG. 1, the part of the mandrel 1 having the largest outer circumference of the tubular outer surface of the mandrel 1. The outer circumference of diaphragm 23 is very close to the inner circumference of the foil 3. The diaphragm 23 can comprises a chamfer like outer edge for contacting the foil. The edge of the diaphragm 23 can be in point contact with the foil. The foil is fed over the diaphragm, the diaphragm having, in an example, a close to circular, at least tubular cross section. Diaphragm 23 therefore provides an outward force on the foil 3, tensioning the foil and supporting the tubular form of the foil around the mandrel. This tubular tension is maintained in the foil transferred over the diaphragm 23 more downstream.

The diaphragm 23 has an outer circumference that is 0.3 mm, preferably about 0.6 mm, or more larger than the outer circumference of the mandrel parts upstream and downstream from the diaphragm 23. Other parts of the mandrel can have an even larger difference in circumference.

Blade clearance 24 allows cutting of the foil to form individual tubular sleeves. Cutting device 10 is shown schematically around the blade clearance and can comprise one or several, in particular four, actuated cutting knives. When actuated, the knives perform a cutting motion through the blade clearance 24, for example a rotational movement cutting the foil.

A further downstream part of the mandrel is formed by the shooter part 26 comprising, amongst others, sleeve discharge unit 9,19 for ejecting the sleeve from the mandrel over the product and static charge collector 28.

In this embodiment tip 31 is the most upstream part of the mandrel 1 and foil 3 is fed around this tip 31 thereby opening the foil 3 and positioning tip 3 in the envelope of the foil. The opened foil 3 will have a tubular form when the foil 3 is fed further downstream over the opening part 21 of the mandrel 1. Foil 3 will take a generally cylindrical form. Transport rollers 6 and 16 are driven and will pull foil 3 over tip 31 in between the rollers 6 and 16 and convey foil 3 according to arrow 12. The transport direction 12 is parallel to the axial direction 35 of mandrel 1.

In the sleeving device the opened foil 3 is fed around the outer surface of the mandrel 1. Foil 3 is transported between transport rollers 6,16. Foil 3 will reach diaphragm 23.

In the embodiment according to FIG. 1, and as shown in more detail in FIG. 2, the diaphragm 23 is positioned at an upstream tip of mandrel body 40 and mandrel body 41. The outward position of the diaphragm 23 and the mandrel body 40,41 on which it is mounted, are, in this embodiment, strictly related, as they are part of the same integral body.

The mandrel bodies 40, 41 are shown in FIG. 2, wherein mandrel body 40 is shown with a dotted line. Mandrel bodies 40,41 together form the outer surface around which the foil 3 is fed. The surface of mandrel bodies 40,41 form outer surfaces of opposite sides of the tubular outer surface. The outer surface, according to this application, is the surface of the mandrel having an elongated tubular form. It has a surface area extending in the angular direction and in the axial direction 35.

The mandrel bodies 40,41 comprise opening 43. Opening 43 receives roller 17a mounted on the shaft of the mandrel 1. Opening 43 is formed between the two mandrel bodies 40,41. Rollers 7a,7b and rollers 17a,17b, as shown in FIG. 5, are beared on the frame 4 and mandrel 1 respectively having an axis of rotation perpendicular to the axial direction 35 of the mandrel 1. A foil fed between the rollers 7a/7b and rollers 17a/17b is transported in the axial direction 35.

As transport rollers 17,7 are positioned downstream from diaphragm 23, foil 3 is drawn over the diaphragm 23 when transport roller 7,17 are driven. Transport rollers 7,17 are mounted downstream from diaphragm 23 and upstream from blade clearance 24.

The transport rollers 6,16 and transport rollers 7,17 are mounted with respect to tip 31 such that corners 36,37 are fed between the respective transport rollers mounted in the frame and transport rollers mounted in the mandrel. This will lead to extra deformation of the corners 36,37 when fed over the mandrel 1. The corners are "squeezed" between the respective transport rollers 6,7 mounted on the frame 4 and transport rollers 16,17 mounted on the mandrel 1.

Cutting device 10 surrounds the mandrel 1 and is arranged for cutting the foil 3 as fed around the outer surface at position 50 along the complete circumference of the sleeve.

Mandrel body 40 is biased outwardly according to arrow 51 as shown in FIG. 4 by a spring 52 mounted between mandrel bodies 40 and 41 around a pin 53. Outward bias according to this application comprises a bias that results in an outward directed movement of the mandrel body.

In an embodiment the bias is provided using repulsive magnets mounted on mandrel and on the frame. In an example pneumatic elements are used for providing outward bias.

The outer surface of mandrel body 40 is part of the same body that comprises the diaphragm 23. The outwardly directed force 51 will force the diaphragm 23 onto the inner surface of the foil 3. The outward biasing force is strong enough to resist some inward pressure exerted by the foil on the diaphragm. On the other hand, the biasing force is small enough to allow inward/outward movement of the mandrel body as a result of e.g. a local reduction of the inner circumference of the foil 3 at the diaphragm 23. As the diaphragm is the most outwardly extending fixed part of the mandrel body 40,41, the outward position of the mandrel body is guided by the actual (instantaneous) circumference of the foil 3 at the diaphragm 23 of the machine in operation. Most surface, e.g. surface part 25, of mandrel body 40 is positioned at a radial distance more inward from the diaphragm 23, e.g. at least 0.05 mm to 0.70 mm, more preferably from 0.10 mm to 0.35 mm. This allows the outer surface of the mandrel body 40 to still provide radial support, but also some space to feed the foil at a small distance from said surface, lowering transport resistance. The outer surface of the mandrel body 41 has a radius 55 as indicated in FIG. 5 although non circular mandrel bodies and outer surfaces also fall within the scope of this invention.

In an embodiment the transport rollers 17 are mounted to the mandrel body and will move in fixed relationship.

Mandrel bodies 40 and 41 are mounted on the mandrel. In an embodiment one of the bodies is an integral part of the frame of the mandrel 3, see e.g. FIGS. 8b - 8e. In the embodiment as shown in FIGS. 1-4, the two mandrel bodies 40,41 are mounted around central shaft 140. Shaft 140 connects the sleeve shot part 107 and tip part 21 for opening the foil 3.

Mounted on the shaft 140 are transport rollers 17. Mounted on the shaft is a frame 141 comprising a shaft 142 over which rollers 17a and 17b are beared.

Mandrel bodies 40,41 can be mounted to the shaft 140 in several manners. In the embodiment according to FIGS. 1-4, upstream and downstream ends of the mandrel bodies 40,41 comprise a pin 144 and a hole 145. Both the sleeve shot part 107 and the downstream end of the mandrel tip part 21 also comprise a pin 147 and a hole 148. Pins 144,147 comprise an outwardly 139 biased ball 149. The mandrel body 40,41 can be mounted between the fixed tip 21 and sleeve shooter part 107 by moving the mandrel body between tip 21 and part 107, wherein ball 149 is received in a respective hole. This embodiment allows fast radial replacement of mandrel bodies.

The ball 149/hole 144,148 suspension of the mandrel bodies 40,41 allows both mandrel bodies to move somewhat in outward directions with respect to shaft 140. The outward bias provided by spring 52 will force the mandrel bodies away from each other. Other embodiments for mounting the mandrel bodies 40,41 in the mandrel still allowing the outwardly biased arrangement are possible.

FIGS. 8b-8f show in cross section different embodiments of mandrel bodies suspended in the mandrel. FIG. 8b shows an embodiment wherein a part 201 similar to shaft 140 is an integral part of mandrel body 202. Mandrel body 203 is movably mounted in the mandrel around an axis 204. Axis 204 can be a shaft connected to the tip 21 and sleeve shot part 107. The axis 204 allows rotation of mandrel body 203 according to arrow 205 and shown with dotted lines. An outward bias is provided that biases the mandrel body 203 away from the mandrel body 202. When foil 3 is fed around the mandrel bodies 202,203, the mandrel bodies outer circumference will depend on the actual inner circumference of the foil 3 fed to the mandrel. As a result of the outward bias, the circumference of the outer surface will automatically adapt to the actual circumference of foil fed around the outer surfaces.

In examples of the invention a part of the mandrel carrying the diaphragm is biased outwardly. Thus the mandrel will provide an outward tension in the tubular foil. In further examples the same part of the mandrel also comprises a tubular outward surface for guiding the foil over the mandrel, the tubular section having a circumference that is smaller than the circumference of the diaphragm.

FIG. 8c shows an embodiment comprising two mandrel bodies 210,211 both mounted hingeable in the mandrel around an axis of rotation 212,213 respectively. An outward bias is provided e.g. using repulsing magnets that force the mandrel bodies 210,211 away from each other in the outward direction.

FIG. 8d shows an embodiment with a single mandrel body 220 comprising a part 221 similar to shaft 140. Mandrel body 220 has two arms 222,223. Arms 222,223 form the outer surface of the mandrel over which the foil is fed. The arms 222,223 can comprise an elastic material that is biased outwardly or a biased element is used to force the arms 222,223 to bend outwardly as indicated by the dotted lines. Again the circumference of the outer surface of the mandrel is adapted to the inner circumference of the actual foil being fed over the mandrel.

FIGS. 8e and 8f show further embodiments. Mandrel body 202 is connected to a mandrel 230 that is mounted to the mandrel having a single degree of freedom in direction 234. A suitable guide, such as pins or rails, is used to allow such relative movement. In FIG. 8f both mandrel bodies 231,233 can move according to direction 234 with respect to the central shaft 232.

The outward bias according to the application is arranged such that the mandrel bodies forming a substantial part of the outer surface of the mandrel, and comprising specifically the diaphragm, can move from the solid line position to a dotted line position in FIGS. 8b-8f, increasing the circumference. Preferably the bias results in substantially equal outward movement for the two or more mandrel bodies.

Turning to FIGS. 1-5, mandrel bodies 40 and 41 both form the outer surface of a substantial part of the mandrel. In the embodiment of FIGS. 1-5 the mandrel bodies form the outer surface of the mandrel both at an upstream side 60 and a downstream side 61 from the blade clearance 24. As these surface 60,61 are part of the same moveable mandrel body, their relative outward position is directly linked.

Preferably the outer surfaces on both sides of the blade clearance 24 have an equal radius/circumference. This results in a symmetrical arrangement on both sides of the blade clearance 24 or first position 50. The symmetrical arrangement will improve the result of the cutting with the cutting device 10, e.g. by the reduction of the formation of pigtails.

As the mandrel outer surface 60 and 61 on both sides of the blade clearance 24 will provide stable support, cutting is also supported and formation of pigtails is reduced.

On both the upstream and downstream end chamfers 62,63 are formed as part of the blade clearance 24 to allow guidance of the foil 3 after cutting over the downstream outer surface 61 of the mandrel 3. The chamfers 62,63 are symmetrically formed in order to obtain a symmetrical arrangement with respect to the first position 50.

Foil 3 is fed a predetermined length beyond the first position 50. In an embodiment the transport of the foil is stopped. During the transport pause cutting device 10 cuts the foil 3 at the first position 50, forming an individual sleeve 70 having a cutting length or predetermined length 71.

Further downstream transport rollers 18 and 8 are provided again having a rotational axis perpendicular to the axial direction 35 of the mandrel 1. Transport rollers also provide an axial guidance for the foil 3 fed beyond the blade clearance 24 or for the individual sleeve 70 having a cutting length or predetermined length 71.

The sleeve 70 is transported further downstream to the discharge part 26. The sleeve 70 is at first still supported by outer surface 61 of the mandrel body 40 and 41 downstream from the blade clearance 24. Further downstream the sleeve inner surface is supported by the outer surface of sleeve shot part 81. Sleeve shot part 81 preferably comprises a tubular outer surface of desired shape, in FIG. 1 a circular cross section.

The sleeve shot part 81 can have a circumference smaller than the circumference of mandrel bodies 41,42. Transport of the sleeve 70 is not hindered in this manner. Sleeve shot part 81 is connected to the downstream end of the mandrel 3 and can comprise transport rollers 19 that cooperate with discharge rollers 9. Rollers 9 and 19 together form the discharge unit. The axis of rotation 90, in FIG. 1 positioned at an angle 50° with respect to the axial direction 35, allows the discharge unit to engage the sleeve 70 at a second position 91 and provide a downward impulse combined with a rotational motion according to arrow 92 to the sleeve.

The sleeve 70 is shot in the axial direction 35. The angular speed results in spinning around the axial direction.

Other embodiments of the discharge unit to provide an angular momentum to the sleeve comprise water jets or pressured air directed at an angle towards the sleeve shot part.

First position 50 is the position of the sleeving device where blade or knives of the cutting device 24 will cut the sleeve. Second position 91 is the position at which the discharge unit 9/19 will engage the sleeve 70 in order to start the discharge or eject the sleeve from the mandrel.

In accordance to some embodiments the predetermined length 71 of the sleeve 70 is about equal to the distance 94 between the first and second position. The discharge unit 9/19 would engage the sleeve 70 already before cutting.

In the embodiment of FIG. 1, the predetermined length 71 or cutting length of the sleeve 70 is smaller than the distance between the first position 50 and second position 91. Foil 3/sleeve 70 is fed beyond the first position 50 by the predetermined length, without being engaged at the second position by the discharge unit 9/19. The foil 3/sleeve 70 is fed only in an axial direction prior to cutting. This will result in less pigtails as engagement by the discharge unit could result in twisting of the sleeve.

The transport rollers 8,18 engage the sleeve 70 after cutting and can transport the sleeve into the discharge unit 9/19. In the shown embodiment the 'engaging after' is the result of the distance between the first and second position.

As the sleeve shot part 81 has a smaller circumference, this provides extra space/less support to the sleeve 70 when conveyed into the discharge unit 9/19. As the discharge unit 9/19 provides an angular momentum to the sleeve when shot, this extra space can be used to allow some twisting of the sleeve 70 around the mandrel 1.

Now an embodiment of a part of a method for sleeving products will be described in combination with FIG. 6a. FIG. 6a shows schematically four steps in the sleeving process according to an embodiment in combination with control signals provided to a drive controller for each the transport rollers. FIG. 6a shows three sets of transport rollers S1,S2,S3. Transport rollers S1,S2,S3 correspond with transport rollers 7,8,9 respectively.

Transport rollers S1 and S2 will feed a foil 401 around mandrel 403. Transport rollers S1 and S2 will drive the foil in the axial direction 404. Transport rollers S3 are sleeve transfer rollers and are part of the discharge unit for ejecting a sleeve of predetermined length from the mandrel over a product 445 aligned with the axial direction.

In this example the circumference of the outer surface of the mandrel 403 is substantially equal at upstream and downstream sides of the blade clearance 405. In FIG. 6a a diameter 410 is indicated, although the invention is not limited to circular cross sections. The circumference of the sleeve shot part 411 near the discharge unit and transport rollers S3 (second position) is smaller than the first circumference of the outer surface upstream from the blade clearance 405 (first position). Close to the blade clearance the outer surface upstream from the blade clearance provides support to the foil by having a circumference only slighter less than the circumference of the foil, resulting in tubular tension similar to the tension from the diaphragm in the foil, which reduces deformations during cutting. Near the discharge unit S3, the circumference, directly dependent on diameter 412, the sleeve/foil is less supported to allow rotation of the sleeve around its axial direction.

For clarity the charge collector is not shown in FIG. 6a. Also not shown are transport rollers on mandrel 403 opposite the transport rollers S1,S2,S3. Although transport rollers S1,S2,S3 are shown at the same opposite sides of the mandrel, it will be clear that they can be positioned at different sides.

Mandrel 403 has blade clearance 405 at first position 406. A cutting device similar to FIG. 1 is mounted on the frame of the sleeving device near first position 406 and allows cutting.

At step 1 as shown in FIG. 6a foil 401 is transported beyond first position 406 by a predetermined length 415. To allow transporting of the foil 401, S1 and S2 (or respective drivers) are provided with a control signal 420,421 respectively. In this embodiment the motion of the foil 401 is stopped when the predetermined length 415 is transported beyond first position 406. Between step 1 and step 2 the foil 401 is cut and a sleeve 423 of predetermined length is formed. Cutting by cutting device is controlled by a signal 424 as indicated in FIG. 6a.

After step 2, before step 3, foil 401 is transported over the mandrel 403. S1 is driven, signal 427. Sleeve 423 is transported downwards over the mandrel. S1 will transport foil of predetermined length beyond first position 406. Transport roller S2 pushes the sleeve axially towards the downstream discharge unit S3. Discharge unit S3 engages the sleeve at the second position 442. The distance 441 between S2 and S3 is somewhat smaller than length 415. During transport of the sleeve 423 the sleeve is engaged by either transport roller S2 or S3 or both.

At step 3 the foil 423 already reached S3 and is engaged by transport rollers S3. Transport rollers S3 drive the sleeve 423 in the axial direction and will impart a rotation movement according to arrow 429. Driving of transport rollers are controlled with control signal 430.

As transport rollers S3 will impart two types of motion onto the sleeve, the drive energy is higher than transport rollers S1,S2. If the angle between axial direction and axis of transport rollers S3 decreases, the rotational speed of S3 is increased.

Although in this embodiment the foil 403 and sleeve 423 are transported with a similar speed, it is possible to move the sleeve 423 with a higher speed directly after cutting.

In this embodiment, as soon as transport rollers S2 do not engage the sleeve 423 anymore, directly after step 3, the transport rollers S3 are driven at a much higher speed, indicated in signal 430 with a high peak 444 directly after 3. During the peak 444 both the axial movement of the sleeve 423 and its rotational speed are increased substantially. This allows arranging the sleeve 423 around product 444 aligned with the axial direction of the mandrel, conveyed by a conveyor (not shown in FIG. 6a.)

Simultaneously with discharging foil 403 is moved the predetermined length and at step 4 the process is repeated.

A further embodiment for a method for sleeving products will be described in combination with FIG. 6b. FIG. 6b shows schematically four steps in the sleeving process according to an embodiment of the invention in combination with control signals provided to a drive controller for each the transport rollers. FIG. 6b shows two sets of transport rollers S11,S13. Transport rollers S11,S13 correspond with transport rollers 7,9 respectively.

Transport rollers S11 will feed a foil 1401 around mandrel 1403. Transport rollers S11 will drive the foil in the axial direction 1404. Transport rollers S13 are part of the discharge unit for ejecting a sleeve of predetermined length from the mandrel over a product 1445 aligned with the axial direction.

The circumference of the outer surface of the mandrel 1403 is substantially equal at upstream and downstream sides of the blade clearance 1405. In FIG. 6b a diameter 1410 is indicated, although the invention is not limited to circular cross sections. The circumference of the sleeve shot part 1411 near the discharge unit (second position) and transport rollers S13 (is smaller than the first circumference of the outer surface upstream from the blade clearance 1405 (first position). Close to the blade clearance the outer surface provides support to the foil, which reduces deformations during cutting. Near the discharge unit S13, the circumference, here indicate with diameter 1412, the sleeve/foil is less supported to allow rotation of the sleeve around its axial direction.

For clarity the charge collector is not shown in FIG. 6b. Also not shown are transport rollers on mandrel 1403 opposite the transport rollers S11 and S13. Although transport rollers S11,S13 are shown at the same opposite sides of the mandrel, it will be clear that they can be positioned at different sides.

Mandrel 1403 has blade clearance 1405 at first position 1406. A cutting device similar to FIG. 1 is mounted on the frame of the sleeving device near first position 1406 and allows cutting.

At step 1 as shown in FIG. 6b foil 1401 is transported beyond first position 1406 by a predetermined length 1415. To allow transporting of the foil 1401, rollers S11 (or respective drivers) are provided with a control signal 1420.

In this embodiment the motion of the foil 1401 is stopped when the predetermined length 1415 is transported beyond first position 1406.

Between step 1 and step 2 the foil 1401 is cut and a sleeve 1423 of predetermined length is formed. Cutting by cutting device is controlled by a signal 1424 as indicated in FIG. 6b.

After step 2, during step 3, foil 1401 is transported over the mandrel 1403. S11 is driven, signal 1422. Sleeve 1423 is transported downwards over the mandrel. Foil 1401 can push the sleeve or the sleeve 1423 can fall downward after cutting the foil. S11 will transport foil of predetermined length beyond first position 1406.

Discharge unit S13 engages the sleeve at the second position 1442. As the distance between the first position 1406 and second 1442 is more than length 1415, sleeve 1423 is unengaged some time.

At step 3 sleeve 1423 already reached S13 and transport rollers S13 engage on an outside surface of the sleeve, clamping the sleeve 1423 in between the rollers S13 and outer surface 1411 of the mandrel. Transport rollers S13 drive the sleeve 1423 in the axial direction and will impart a rotation movement according to arrow 1429. Driving of transport rollers can be controlled with control signal 1430.

As transport rollers S13 will impart two types of motion onto the sleeve, the drive energy is higher than transport rollers S11. If the angle between axial direction and axis of transport rollers S13 decreases, the rotational speed of S13 is increased.

In this embodiment foil 403 pushes sleeve 423 towards the discharge unit/second position.

In this embodiment already before step 3, the transport rollers S3 are driven at a much higher speed, indicated in signal 1430 with a high peak 1444. During the peak 1444 both the axial movement of the sleeve 1423 and its rotational speed are increased substantially. This allows arranging the sleeve 1423 around product 1444 aligned with the axial direction of the mandrel, conveyed by a conveyor (not shown in FIG. 6b in or out of the plane of the paper of FIG. 6b).

Simultaneously with discharging foil 403 is moved the predetermined length and at step 4 the process is repeated.

In FIG. 6b drive units 1450,1451 of rollers 1452,1453 are shown on opposite sides of the mandrel 1403. The drive units have a shaft 1454,1455 respectively. As the drive is controlled, shaft 1454,1455 will rotate and roller 1452,1453 will impart impulse onto the sleeve. The shaft axis is not positioned parallel to the mandrel axis and to the conveyor transport direction. The drive units are positioned downwardly and outwardly away from the mandrel, surrounding the conveyor and container 1445 passing underneath the mandrel 1403. By positioning the drive units at an angle of at least 5 degrees with respect to the mandrel axis (or the plane of mandrel and conveyor), more space is created between the opposite drive units. The elongate drive units having the shafts 1454,1455 at one end, are positioned starting from un upright position tilting the bottom end outwardly follow by a rotation around the longitudinal axis of the drive units.

A further embodiment of a part of a method for sleeving products will now be described referring to FIG. 6c FIG. 6c is similar to FIGS. 6a and 6b in that it schematically shows four steps in the sleeving process according to an embodiment of the invention in combination with control signals provided to a drive controller for each the transport rollers. FIG. 6c shows two sets of transport rollers S21,S23. Transport rollers S21, S23 correspond with transport rollers 7,9.

Transport rollers S21 feed a foil 2401 around mandrel 2403. Transport rollers S21 will drive the foil in the axial direction 2404. Transport rollers S23 are sleeve transfer rollers and are part of the discharge unit for ejecting a sleeve of predetermined length from the mandrel over a product 2445 aligned with the axial direction.

The circumference of the outer surface of the mandrel 2403 is substantially equal at upstream and downstream sides of the blade clearance 2405. In FIG. 6c a diameter 2410 is indicated, although the invention is not limited to circular cross sections. The circumference of the sleeve shot part 2411 near the discharge unit and transport rollers S23 is smaller than the circumference near the blade clearance 405.

In fact the mandrel outer surface has a substantially constant circumference from the blade clearance 2405 until halfway to the roller 823. The second half, after the necking in, also has a substantially constant but smaller circumference, e.g. at least 1% smaller or preferably at least 5% smaller.

Close to the blade clearance the outer surface provides support to the foil, which reduces deformations during cutting. Near the discharge unit S23, the circumference, here indicated with diameter 2412, the sleeve/foil is less supported to allow rotation of the sleeve around its axial direction.

Mandrel 2403 has blade clearance 2405 at first position 2406. A cutting device similar to FIG. 1 is mounted on the frame of the sleeving device near first position 2406 and allows cutting.

At step 1 as shown in fig.6c foil 2401 is transported beyond first position 2406 by a predetermined length 2415. The downstream end is barely engaged by rollers S23. To allow transporting of the foil 2401, 821 (or respective drivers) are driven using with a control signal 2420.

In this embodiment the motion of the foil 2401 is stopped when the predetermined length 2415 is transported beyond first position 2406.

Between step 1 and 2 the foil 2401 is cut and a sleeve 2423 of predetermined length is formed. Cutting by cutting device is controlled by a signal 2424.

After step 2, during step 3, foil 2401 is transported over the mandrel 2403. S21 is driven, signal 2427. S21 will transport foil of predetermined length beyond first position 406.

Sleeve 2423 is transported downwards over the mandrel engaged by discharge unit S23 and will be ejected while rotating.

At step 3 transport rollers S23 will continue to drive the sleeve 2423 in the axial direction and will impart a rotation movement according to arrow 2429. Driving of transport rollers are controlled with control signal 2430.

As transport rollers S23 will impart two types of motion onto the sleeve, the drive energy is higher than transport rollers S21. If the angle between axial direction and axis of transport rollers S23 decreases, the rotational speed of S23 is increased. Signal 2430 with a high peak 2444 shows that larger rotational speed of discharge rollers S23. During the peak 2444 both the axial movement of the sleeve 2423 and its rotational speed are increased substantially. This allows arranging the sleeve 2423 around product 2444 aligned with the axial direction of the mandrel, conveyed by a conveyor (not shown in FIG. 6.)

Simultaneously with discharging foil 2403 is moved the predetermined length and at step 4 the process is repeated.

FIG. 9 shows a side view of an embodiment of a device for the method according to FIG. 6c. The predetermined length or cutting length 101 of sleeve 102 is now substantially equal to the distance between first position 104 and second position 105.

In FIG. 9 shooting or discharging the sleeve 102 is shown. Sleeve 102 is shown in a partially discharged position. Sleeve 102 is shot in the axial direction 109 and simultaneously provided with an angular momentum.

Sleeve 102 is transported along the charge collector 150 for collecting static electricity mounted near the downstream end of the mandrel.

Sleeve 102 will be arranged over a product 130. Product 130 is one of a row of products 131 conveyed by a conveyor 132 in a direction 133. Product 134 is already provided with an individual sleeve 135 of predetermined length. The conveyor 132 conveys the products under the mandrel and aligns the products with the axial direction of the mandrel. In an embodiment the products 131 are transported continuously.

In this embodiment the outer surface between the first and second position comprises two tubular surface areas of different circumference. These tubular surface areas are characterized by a substantially radius of the outer surface in the axial direction. The two tubular surface areas are separated by a necking-in.

Directly downstream from the blade clearance 24, the outer surface is formed by bodies having a larger circumference than the tubular outer surface of the sleeve shot part 107. In an embodiment the transition, here a necking-in, from larger to smaller circumference is positioned at about 30-70% of the predetermined length of the sleeve between the first and second position. Before cutting, the sleeve 70 is already engaged by discharge unit 9/19 and this will result in some twisting of the sleeve near the discharge unit 9/19. However as the circumference of the outer surface 161 near the blade clearance 24 is only somewhat smaller than the inner circumference of the sleeve 70, as a result of the outward bias, the twists in the foil 3/sleeve 70 are only formed in the sleeve part surrounding the sleeve shot part 107 of smaller circumference. The space or tolerance between the circumference of the mandrel near the blade clearance 24 prevents twisting of the sleeve in that area. Without the twisting of the sleeve, even though the discharge unit already engages the sleeve before cutting, the sleeve can be cut with reduced formation of pigtails.

In the embodiment according to FIG. 9, twists 110 are shown on the sleeve 102 in the part of the sleeve positioned downstream from transition 111. Twists only arise in the sleeve surrounding the sleeve shot part 107.

In yet another embodiment a further diaphragm is positioned downstream from the blade clearance 24 and upstream the discharge unit 9/19. Such a diaphragm prevents twists from reaching the blade clearance 24.

In the embodiment according to FIGS. 1,2 and 9 a charge collector 28,150 for collecting static electricity is positioned near the downstream end of the mandrel 3. The static charge collector 28,150 comprises electrically conducting filaments 180 extending outwardly from a body 181 that can be mounted using pin 182 on the downstream end of the mandrel 31. Sleeves 70,102 will pass the collector 28,150. In an embodiment the filaments extend such that they are in contact with the sleeve.

Static electricity is collected also on the inside surface of the foil 3. This static electricity can result in friction with or adhesion of the foil to other surfaces or can even provide a inward force bringing the foil back to the flat envelope shape.

The collector 28,150 mounted on the mandrel 1 is arranged to collect electrostatic charges present on the inside surface of the foil 3/sleeve 70. As the sleeve passes the collector 28, charge collector 28,150 collects positive and negative charges present on the inside of the foil. The charges are transferred to charge collector elements, such as filaments 180. Charge is collected on the filaments and distributed over the body 181 comprising a conductive material. The filaments can be electrically connected to each other and collected positive and negative charges will cancel out, already reducing the static charges present on the foil. In any of the embodiments the charge collector can be arranged to redistribute static charges on the inside surface of the foil.

The static charge can be electrically discharged, e.g. after shooting the sleeve in a subsequent step, preferably performed while no sleeve surrounds the collector 28,150. FIG. 7 shows a side view. In an embodiment collector 28,150 comprises or is connected to a charge capacitor. In other examples the charge collector 28,150 is positioned more upstream and in an example a inside foil discharge unit comprising the charge collector for collecting charge from the inside of the sleeve is positioned in a foil supply unit, upstream from the mandrel.

Conveyor 132 supports a row of containers 131. Sleeve 135 was shot around product 134. Product 130 moved under the downstream end of mandrel I ready to receive sleeve 70 to be shot in direction 109.

During the process of sleeving the product, during a small time span, collector is not surrounded by sleeves. A sharp tip 186 of a conductor 185 connected to the earth 187 formed by frame 4 of the sleeving device provides the possibility of electrically discharging the collected static charge from collector 28.

As a result of the collected charge in collector 28, a high electric field can be formed between tip 186 and filaments 180. This field will be high enough for a spark discharge 188 between collector 28 and tip 186. A spark gap of several millimetres between collector 28 and tip 186 can remain. Electric fields of 1000V/mm can be obtained.

The figures show only a possible embodiment of the electrical discharge unit for static charge from the inner sleeve. The inside sleeve discharge unit comprises arranged on the mandrel, an electrical charge collector 28 comprising electrically conductive material. This material is at least arranged along a least a part of a circumferential surface of the mandrel. Preferably the material, e.g. filaments 180, is directed outward from the body 181 of the collector. The collector can comprise a single layer of filaments extending outwardly or multiple layers as indicated in FIG. 1.

As part electrical discharge unit for static charge from the inner sleeve the electrical discharger tip 186 is mounted on the frame. The tip is mounted at a short distance from a conductor connected to the collector on the mandrel, whilst the discharger is connected to the earth.

In an embodiment a current or charge meter is connected to the discharge for measuring the discharge current/charge. If the discharge is lower than a threshold, this can be an indication of wear of the collector.

In the embodiment according to FIG. 1/7 the discharger tip 186 and collector 28 are not connected directly. Removing the electrical charge according to an aspect of the invention comprises two subsequent steps: first removing the charge from the sleeve by collecting the static charge on the collector mounted on the mandrel, already comprising the cancelling out of opposite charges, and second removing the collected charge by electrical discharge via a conductor mounted on the frame.

With the static charge removed, charge collector 28 can collect a further static charge load from a next sleeve or from foil, if the charge collector is positioned more upstream.

Discharge tip 186 can comprise an actuator that forces the tip 186 to actually contact the collector/filaments during the period that no sleeve is present around the collector 28. During passage of the sleeve, the actuator controls the discharge tip to move outwards to allow passage.

Although the discharge tip 186 is shown in FIG. 7 at the upstream side from mandrel 1 in relation to transport direction 133, it is preferred also to position the discharge tip at one of the opposite sides along the transport direction 133, in FIG. 7 in and out of the paper. As the sleeve is discharge in direction 109, the sleeve could move in the downstream direction 133 due to the movement of product 130 and could collide with the discharge tip.

In some embodiments the static electricity collector is mounted more upstream. Still the discharge tip 186 can be positioned near the downstream end of the mandrel. The charge collector can comprises a conductor connecting the more upstream collector with a position near the tip of the mandrel, in the vicinity of the tip 186. The collected electrical charge can still be removed by spark discharge.

In some embodiments the electrical spark discharge takes place through the foil 3. If the foil comprises perforations, the spark is preferably discharged through those perforations. Discharge tip 186 can be positioned more upstream on one side of the foil 3, while static electricity charge collector comprising filaments is positioned on the other inside of the foil 3. Charge is collected and discharged through the foil when sufficient charge is collected.

Not shown, but possibly combined with any of the embodiments, is an electrical discharge unit for static charges from the outside of the sleeve. Such a static discharge unit can comprise electrical conductors mounted close or in contact with the outer surface of the foil 3 or sleeve 70. The electrical conductors can comprise conductive filaments. Multiple filaments, directed inwardly, can be positioned around the sleeve passage. The charge collector can comprise a ring like conductor connected with the filaments. Collected charges can be discharged immediately as a permanent connection to the ground is available: the collector is mounted on the frame of the sleeving device.

The conductive filaments have a sharp tip. The arrangement of multiple electrical conductors on the charge collector 28 forms a multi needle structure of electrical conductors.

In an embodiment the charge collector comprises brushes or other embodiments as shown in U.S. Pat. No. 3,757,164, included by reference. Clearly the collector according to this invention can comprise any of the features, embodiments and specifically compositions of filaments known from U.S. Pat. No. 3,757,164.

FIG. 10 shows schematically a system for labelling containers. A foil roll 500 is provided in a foil stock 501. The roll provides foil 502. Foil is fed to a buffer 503. Buffer 503 can buffer foil e.g. when a roll 500 is replaced, to provide a continuous feed to sleeving device 506 comprising a mandrel 507 and discharge units 508. Sleeves 510 are cut and shot over containers 509 supported and conveyed by conveyor 512. Containers are aligned with the discharge unit 508. Conveyor 512 transports the sleeved containers further downstream e.g. into a steam oven 513. Foil 502 is a heat shrink foil. The steam will shrink the sleeve and the sleeve is attached to the container, providing a labelled container 518.

FIG. 11 shows a detail of a further example of the mandrel 800 according to the invention. In this example foil fed over the mandrel 800 is not shown. Foil would be supplied over the mandrel in a direction 818 downwardly. Mandrel 800 has a transport roller 816 positioned between diaphragm 804 and blade clearance 805. Transport roller 816 can cooperate with a corresponding roller of the sleeving device in which the mandrel is mounted. The cooperating rollers sandwich the foil in between. The not shown transport roller of the sleeving device can comprise a drive. The roller is driven by a controller according to a suitable pattern. The rollers are arranged to mount the mandrel in the sleeving device. Foil is drawn over the diaphragm 804 by roller 816. This prevents the formation of wrinkles in the foil or even the complete blocking of the supply of foil.

Diaphragm 804 will have a circumference C1. This circumference C1 will correspond closely to the inner circumference of the foil fed over the mandrel. The radial positioning of the foil, forcing the foil radially outward in a tubular form, provides tension in the foil fed over the mandrel. In any of the examples described herein the mandrel can comprise a diaphragm 804 arranged to radially position the foil. In any of the examples the diaphragm 804 can be positioned upstream from the blade clearance 805.

The outer surface 801 of the mandrel upstream from the blade clearance 805 has a first circumference C2 that is close to but somewhat smaller than circumference C1. The outer surface 801 forms a part of the outer surface of the mandrel 800 extending over an axial distance. Here axial length 820 has a constant first circumference C2. In an embodiment the first circumference C2 is at least 0.5% smaller than circumference C1, in an example at any position along the axial length 820. The difference in radius is indicated by arrow 810. As the first circumference C2 is only somewhat smaller than the inner circumference of the foil fed over the mandrel, the outer surface 801 will provide radial positioning of the foil on the one hand, without significantly increasing the friction of the foil being guided over the mandrel 800. In combination with the diaphragm the tension is maintained. In examples the first circumference is a circumference of the outer surface of the mandrel upstream from the blade, somewhat smaller than the diaphragm circumference, of the part of the outer surface providing radial positioning without significant friction.

In this example an upstream chamfer 806 and a downstream chamfer 807 are formed on the mandrel 800 directly upstream and downstream from the blade clearance. These chamfers 806,807 are not part of the outer surface and have a significant smaller circumference. Chamfers 806,807 are part of the blade clearance. Chamfer 807 is arranged to allow guidance of a foil end over the outer surface 802 of the further downstream part of the mandrel 800. Chamfer 807 guides the foil outwardly in order to be fed over the outer surface. Chamfer 806 is formed in order to provide symmetry at the blade clearance resulting in fewer pigtails.

Although in other embodiments the circumferences of the outer surface 801, 802 directly upstream and downstream respectively of the blade clearance 805 are generally equal, in the example of FIG. 11, the circumferences C2 and C3 differ. Second cCircumference C3 is smaller than first circumference C2, indicated by the radius difference 811. The example of FIG. 11 is a less preferred example. The circumferences C2,C3 of the outer surfaces 801,802 are preferably generally equal directly upstream and downstream from the blade clearance 805/chamfers 806/807 to reduce the formation of pigtails. A symmetrical arrangement is preferred.

Further downstream, e.g. at the part 825 indicating a zone downstream from the blade clearance 805. SL is the sleeve length, corresponding almost with the distance between the blade and the discharge unit 830. In the example of FIG. 11 sleeve length SL is somewhat smaller. Zone 825 is the area at a distance of 20%-80% of the sleeve length SL. In this zone the mandrel can be necked-in, similar to FIG. 6a, Circumference C4 will be smaller than circumference C3.

In the embodiment of FIG. 11 the part of mandrel 800 downstream from the blade clearance 805 has an outer surface 802 having circumference C3=C4. The downstream part of the mandrel having outer surface 802 has a constant circumference. In other embodiments the outer circumference can vary.

The embodiment according to FIG. 11 allows cutting the sleeve having a predetermined sleeve length SL (after feeding the predetermined sleeve length beyond the blade clearance 805) and allowing the cut sleeve to 'fall' into the roller 830 of the sleeve discharge unit 831. Because outer surface 802 has a smaller circumference, the friction of foil sliding over the outer surface 802 is further reduced, allowing the foil to slide downward according to arrow 818 as a result of the force of gravity, contrary (or additionally) to examples of FIGS. 6a-6e.

Sleeve discharge unit 831 is, in the shown embodiment, a separate part mountable to the end of the mandrel 800 downstream from outer surface 802. In most embodiments it will have a circumference C5 that is equal or smaller than circumference C4. However C5 can be more than C4.

In an embodiment the roller 830 of the sleeve shot unit 830 can extend radially from the outer surface 832, locally increasing the circumference over which the foil is to be fed. In accordance to this application, the increase in circumference as a result of the radial extension of a roller is not taken into account when assessing the second circumference 809.

The position of for determining the second circumference according to the invention is a preferably a position close to the second position, that is the position at which the foil is engaged by roller 830.

In embodiment the circumference of the outer surface 802 only decreases downstream from the blade clearance 805. This prevents hindrances in the foil feeding path.

It should be noted that, in combination with the outwardly biased mandrel bodies having the diaphragm, circumference C1-C4 can vary as these circumferences are taken around the movable mandrel bodies.

Table 1 provides eight examples of combinations of:
C0=internal circumference of the tubular foil,
circumference C1 at the diaphragm
(first) circumference C2 between the diaphragm and blade clearance
circumference C3 at about 10% of the sleeve length downstream from blade clearance 805,
(second) circumference C4 at about 80% of the sleeve length downstream from the blade clearance
and circumference C5 of the outer surface of the discharge unit 830, circumferences in mm:

TABLE 1

|    | C0    | C1    | C2    | C3    | C4    | C5    |
|----|-------|-------|-------|-------|-------|-------|
| E1 | 170   | 169.9 | 168.9 | 168.9 | 168.9 | 166.4 |
| E2 | 194.8 | 194.7 | 193.7 | 193.7 | 193.7 | 191.6 |
| E3 | 209.9 | 209.8 | 208.8 | 208.8 | 208.8 | 208.8 |
| E4 | 229.9 | 229.9 | 228.9 | 228.9 | 225.7 | 224.8 |
| E5 | 116   | 115.9 | 114.9 | 114.9 | 111.8 | 111.5 |
| E6 | 431.9 | 431.8 | 430.8 | 430.8 | 427.7 | 426.7 |
| E7 | 116   | 114.4 | 112.8 | 103.7 | 103.7 | 113.1 |

Any of the mandrel embodiments can be combined with different sleeve lengths. Specifically the arrangements having C3<C2 have a discharge unit positioned such that a sleeve is engaged at more than a sleeve length distance downstream from the blade clearance. In the above examples C4 and C5 are between 0,8%-7% smaller than C1.

In any of the embodiment C2 can be the first circumference, whereas any of the circumferences C3,C4,C5 can be the second circumference.

Example E7 shows an example wherein the circumference at the discharge unit is increased in combination with a significantly reduced circumference in the downstream part from the blade clearance. Example E7 comprises a significant necking-in at C3 and C4 allowing the free fall of the sleeve, directly after cutting the predetermined length of sleeve from the foil. The sleeve will fall into the sleeve discharge unit.

Clearly many different embodiments are possible within the scope of the invention.

The invention claimed is:

1. A mandrel configured to be suspended in a sleeving device for arranging sleeves around containers, the mandrel (i) configured to open a foil to form a sleeve and (ii) having a substantially tubular outer surface around which the foil is fed, the outer surface of the mandrel being formed by at least two separate mandrel bodies, wherein at least one mandrel body is biased outwardly to increase the circumference of the outer surface and wherein the at least one mandrel body biased outwardly is configured to be continuously adjusted to control the circumference of the outer surface during operation of the mandrel.

2. The mandrel according to claim 1, wherein the at least one mandrel body biased outwardly is substantially radially moveable connected to the mandrel.

3. The mandrel according to claim 1, wherein an outwardly biased element connects the mandrel bodies.

4. The mandrel according to claim 3, wherein the outwardly biased element comprises a spring.

5. The mandrel according to claim 1, wherein the at least two mandrel bodies form opposite sides of the outer surface of the mandrel.

6. The mandrel according to claim 1, the mandrel comprising a central frame and at least one mandrel body is movably suspended to the central frame.

7. The mandrel according to claim 1, wherein the outer surface of at least one of the mandrel bodies comprises a diaphragm over which the foil is fed.

8. The mandrel according to claim 7, wherein the diaphragm is positioned near an upstream end of the mandrel body.

9. The mandrel according to claim 7, the mandrel comprising foil transport rollers, wherein the diaphragm is positioned upstream from the foil transport rollers and the mandrel body forms the outer surface both upstream and downstream from the foil transport rollers.

10. The mandrel according to claim 9, wherein the foil transport rollers are positioned upstream from the blade clearance.

11. The mandrel according to claim 1, wherein the at least one mandrel body comprises a blade clearance to allow cutting the sleeve fed around the mandrel bodies and the mandrel body forms the outer surface of the mandrel upstream and downstream from the blade clearance.

12. The mandrel according to claim 11, wherein a circumference of the mandrel body upstream and downstream from the blade clearance is substantially equal.

13. The mandrel according to claim 11, wherein the mandrel body is chamfered directly upstream and downstream from the blade clearance.

14. The mandrel according to claim 1, the mandrel comprising:
   an upstream tip for opening the foil;
   a sleeve cutting part; and
   a downstream sleeve shooter part,
   wherein the sleeve cutting part comprises the at least two mandrel bodies.

15. The mandrel according to claim 14, wherein the upstream tip comprises an inlet side configured as a generally flat element portion and a transition element, the mandrel widens from the inlet side in a direction perpendicular to the plane of the foil, and a direction of the outward bias is generally perpendicular to the plane of the foil.

16. The mandrel according to claim 1, wherein the mandrel is configured to have no externally actuated parts.

17. A sleeving device for arranging a sleeve around a container, the sleeving device comprising:
   a frame;
   a foil feeding unit mounted to the frame configured to feed foil to the mandrel according to claim 1, the mandrel being suspended to the frame;
   a cutting unit configured to cut a sleeve; and
   a sleeve dispatch.

18. A method for feeding a foil over a mandrel for arranging sleeves around containers, the method comprising biasing an outer surface of the mandrel outwardly for tensioning the foil around the mandrel and continuiusly adjusting the outer surface of the mandrel in response to a varying inner circumference of the foil,
   wherein the foil is fed to the mandrel and over and around the outer surface of the mandrel, and
   the foil is cut into sleeves to be arranged around the containers.

* * * * *